US011032739B2

(12) United States Patent
Ly et al.

(10) Patent No.: US 11,032,739 B2
(45) Date of Patent: Jun. 8, 2021

(54) DYNAMIC HEADER COMPRESSION FOR CONSTRAINED NETWORKS

(71) Applicant: CONVIDA WIRELESS, LLC, Wilmington, DE (US)

(72) Inventors: Quang Ly, North Wales, PA (US); Chonggang Wang, Princeton, NJ (US); Mahmoud Watfa, Saint Leonard (CA); Xu Li, Plainsboro, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/491,322

(22) PCT Filed: Mar. 6, 2018

(86) PCT No.: PCT/US2018/021080

§ 371 (c)(1),
(2) Date: Sep. 5, 2019

(87) PCT Pub. No.: WO2018/165113

PCT Pub. Date: Sep. 13, 2018

(65) Prior Publication Data

US 2020/0022022 A1 Jan. 16, 2020

Related U.S. Application Data

(60) Provisional application No. 62/469,601, filed on Mar. 10, 2017.

(51) Int. Cl.
*H04W 28/06* (2009.01)

(52) U.S. Cl.
CPC .................................. *H04W 28/06* (2013.01)

(58) Field of Classification Search
CPC ............................... H04W 28/06; H04L 69/04
See application file for complete search history.

(56) References Cited

U.S. PATENT DOCUMENTS

2011/0249610 A1* 10/2011 Ho ........................ H04W 28/06 370/315
2013/0324114 A1* 12/2013 Raghothaman ....... H04W 36/03 455/426.1

(Continued)

FOREIGN PATENT DOCUMENTS

WO 2011/057154 A1 5/2011

OTHER PUBLICATIONS

Narten, T., RFC 4861: Neighbor Discovery for IP version 6 (IPv6), Sep. 2007, IETF (Year: 2007).*

(Continued)

*Primary Examiner* — Charles C Jiang
*Assistant Examiner* — Shawn D Miller
(74) *Attorney, Agent, or Firm* — BakerHostetler

(57) ABSTRACT

A header compression indicator may be used to enable header compression between a device and a gateway and between end devices in a network of constrained devices. The header compression indicator may be used to signal that header compression is in use, along with which context is to be used, and parameters thereof. The header compression indicator may also be used to trigger creation, update, retrieval, or deletion of a header compression context dynamically. A header context data format may be used to convey the encoding of header option information and corresponding data used in the management of the header compression contexts. Header compression contexts may be created, modified, queried, or deleted dynamically via existing messaging frameworks and operations, e.g., by appending a header compression indicator to existing standard messages.

16 Claims, 21 Drawing Sheets

ES = IoT Devices
ES
ES
ES
LPWAN Compressor (Gateway)
Context1
Context2
Context3

(56) References Cited

U.S. PATENT DOCUMENTS

2016/0142518 A1* 5/2016 Raina .................... H04W 28/06 370/230
2016/0142951 A1* 5/2016 Balasubramanian ........................ H04W 36/023 370/331

OTHER PUBLICATIONS

Sornin, N., LoraWAN Specification Version V1.0.2, Jul. 2016, LoRa Alliance (Year: 2016).*
Minaburo et al., lpwan Working Group Internet Draft, Informational, "LPWAN Static Context Header Compression (SCHC) and Fragmentation for IPv6 and UDP draft-ietf-Ipwan-ipv6-static-context-hc-01", Mar. 2, 2017, 20 pages.
Minaburo et al., lpwan Working Group Internet-Draft, Informational, "LPWAN Static Context Header Compression (SCHC) for IPv6 and UDP draft-ietf-Ipwan-ipv6-static-context-hc-00", Dec. 5, 2016, 14 pages.
Shelby et al., 6LoWPAN Working Group Internet Draft Updates: 4944, "Neighbor Discovery Optimization for Low Power and Lossy Networks (6LoWPAN) draft-ietf-6Lowpan-nd-21", Aug. 24, 2012, 61 pages.

* cited by examiner

HCC ID: Header Compression Context Identifier

CC*: This bit represents multiple uses that depends on the values of the Control bits HCD: Header Context Data

| Control | | | Header Encoding | | | | | | | | | | | | | |
|---|---|---|---|---|---|---|---|---|---|---|---|---|---|---|---|---|
| *7* | *6* | ***Header Encoding*** | *5* | *4* | *3* | *2* | *1* | *0* | *7* | *6* | *5* | *4* | *3* | *2* | *1* | *0* |
| 0 | 0 | Use short HCC ID | ID1 | | ID2 | | | | | | | | | | | |
| 0 | 1 | Use full HCC ID | ID1 | | | | | | | ID2 | | | | | | |
| 1 | 0 | Create/Delete HCC | Del | Rsp | Reserved | | PC | | NU | ID1 or ID2 | | | | | | |
| 1 | 1 | Update/Retrieve HCC | Upd | Reserved | | | PC | | CC | ID1 or ID2 | | | | | | |

Context IDs: ID1 = IPv6/UDP context, ID2 = CoAP context
Del (Delete) bit: 1 = delete context, 0 = create context
Rsp (Response) bit: 1 = provide response, 0 = no response
PC (Protocol Context) bits: bit 1 = CoAP protocol, bit 0 = IPv6/UDP protocol
Upd (Update) bit: 1 = update context, 0 = retrieve context
CC (Concurrent) bit: 1 = update context and send message, 0 = only update context
NU (Not Used) bit: Bit is not used in this mode of operation

FIG. 5

| 3 bits | 5 bits | 0-n bytes |
|---|---|---|
| **Header Delta** | **Size** | **Header Value** |
| 000-111 | 00000 | |
| 000-111 | 00001-11100 | (Size) bytes |
| 000-111 | 11101 | 29 bytes + continues |
| 111 | 11110 | Skip header, advance to next header |
| 111 | 11111 | End context info |

FIG. 7

| | MACPayload | | | | | | | | | | | | |
|---|---|---|---|---|---|---|---|---|---|---|---|---|---|
| | *AppNonce* | *NetID* | *DevAddr* | *DLSettings* | *RxDelay* | *CFList* | **10** | 0 | **1** | 000 | 01 | 0 | 0000011 |
| bytes: | 3 | 3 | 4 | 1 | 1 | 16 | Shim Header = 2 | | | | | | |

FIG. 13

| | ***HCI Header*** | | | | | | ***Header Context Data*** | | | | |
|---|---|---|---|---|---|---|---|---|---|---|---|
| | 11 | 1 | 0 | 00 | 01 | 1 | 00000010 | 111 | 11110 | 001 | 00010 | 11011111110010000 |
| Field: | C | U | R | Rsvd | PC | CC | Context ID | HD1 | Size1 | HD2 | Size2 | HV2 |

FIG. 14

HCC #:
3

Context Type:
IPv6/UDP

| IPv6/UDP Options | Value |
|---|---|
| IPv6 Version | 0110 |
| Traffic Class | 0 |
| Flow Label | 0 |
| Hop Limit | 255 |
| Source Address | 2001:db8:85a3:0:0:8a2e:370:7334 |
| Destination Address | 0:0:0:0:0:FFFF:402F:78C2 |
| Source Port | 59000 |
| Destination Port | 57232 |

DYNAMIC HEADER COMPRESSION FOR CONSTRAINED NETWORKS

CROSS REFERENCE TO RELATED APPLICATIONS

This Application is a National Stage Application filed under 35 U.S.C. § 371 of International Application No. PCT/US2018/021080 filed Mar. 6, 2018, which claims the benefit of U.S. Provisional Patent Application Ser. No. 62/469,601 filed Mar. 10, 2017, the disclosure of which is hereby incorporated by reference as if set forth in its entirety herein.

BACKGROUND

Machine-To-Machine (M2M), Web-of-Things (WoT), and Internet-Of-Things (IoT) network deployments may include 3GPP 5G networks with 5G mobile core network nodes with operations such as network function virtualization and 5G connections establishment. M2M/IoT entities such as IoT devices and IoT gateways may interact on multiple communications protocol layers, such as the network layer (e.g., IPv6) and application protocol layer (e.g., CoAP), in accordance with various protocol standards and conventions, such as IETF LPWAN, IETF CoRE, 3GPP, and LoRa, for example.

SUMMARY

A header compression indicator may be used to enable header compression between a device and a gateway and between end devices in a network of constrained devices. The header compression indicator may be used to signal that header compression is in use, along with which context is to be used, and parameters thereof. The header compression indicator may also be used to trigger creation, update, retrieval, or deletion of a header compression context dynamically. A header context data format may be used to convey the encoding of header option information and corresponding data used in the management of the header compression contexts.

Header compression contexts may be created, modified, queried, or deleted dynamically via existing messaging frameworks and operations, e.g., by appending a header compression indicator to existing standard messages, such as a device joining operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

FIG. 5 illustrates an example LPWAN HCl header encoding format.

FIG. 7 illustrates an example header context data format.

FIG. 13 illustrates an example join-accept message in a LoRaWAN that includes a header compression context creation response.

FIG. 14 illustrates an example message using a concurrent bit for dynamic update of a header compression context.

DETAILED DESCRIPTION

Figure 1:
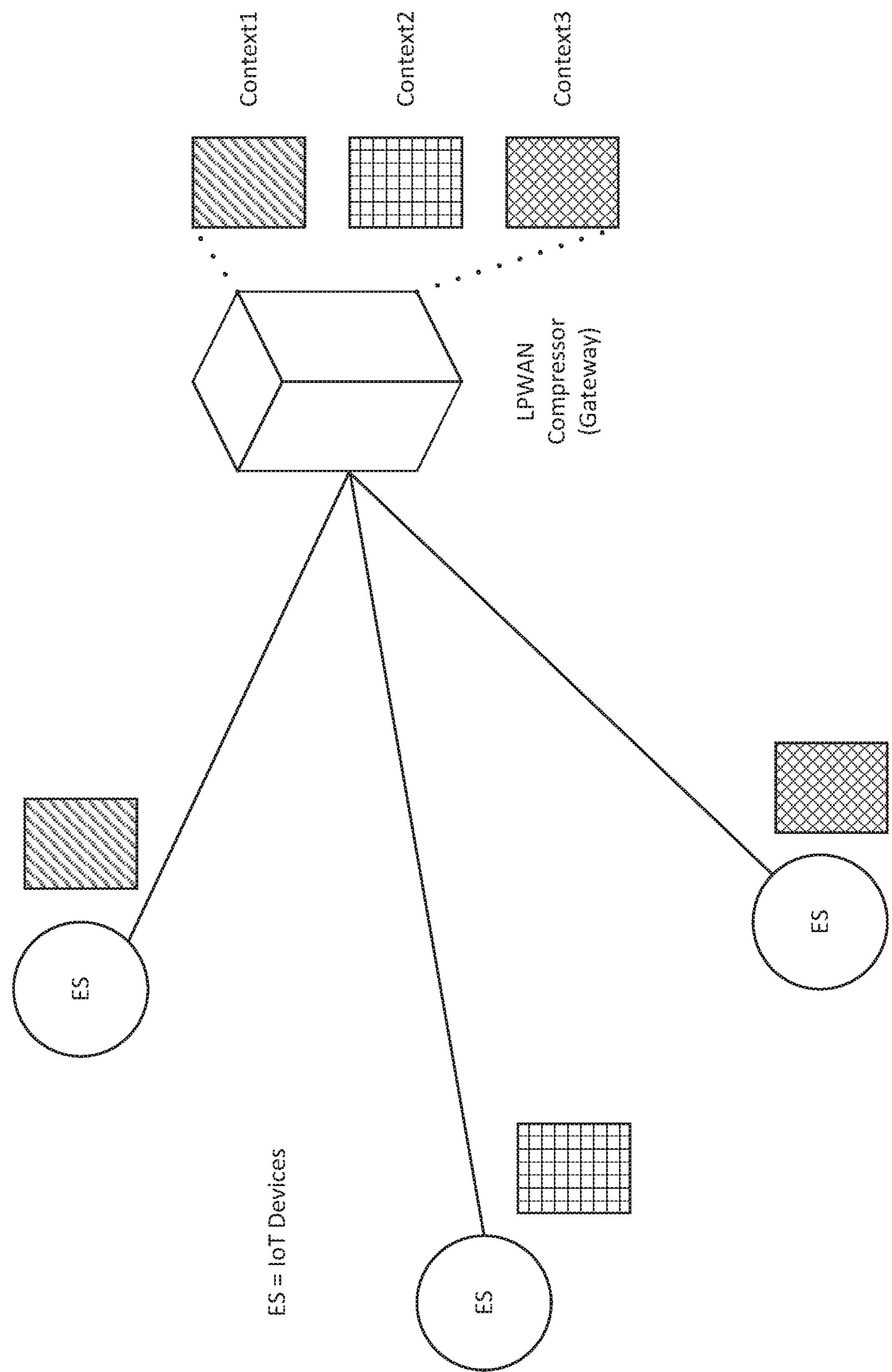
FIG. 1 is a system diagram of an example LPWAN with a gateway and three devices.

Dynamic header compression may be used in constrained networks to economize network bandwidth consumption and adapt to network changes, such as changes in architecture and addresses. Herein the term “header compression” refers to the compression of protocol headers, such as IPv6, UDP, and CoAP protocol headers, for example.

A header compression indicator may be used to enable header compression between a device and a gateway and between end devices in a network of constrained devices. The header compression indicator may be used to signal that header compression is in use, along with which context is to be used, and parameters thereof. The header compression indicator may also be used to trigger creation, update, retrieval, or deletion of a header compression context dynamically. A header context data format may be used to convey the encoding of header option information and corresponding data used in the management of the header compression contexts.

Header compression contexts may be created, modified, queried, or deleted dynamically via existing messaging frameworks and operations, e.g., by appending a header compression indicator to existing standard messages, such as a device joining operation.

Header compression contexts may be stored in any network device. The creation, update, retrieval, and deletion of header compression contexts may be initiated by any device. For example, an end device such as a user equipment (UE) apparatus may initiate the creation of a header compression context by a gateway when joining a network by appending a header compression indicator to a join request. The gateway may also inform UEs of the arrival of a new device by providing dynamic header compression context information to one or more UEs, allowing the UEs to communicate with the newly arriving device via compressed headers. Thus the use of compressed headers is not limited to static header compression data provided to UEs at the time of deployment.

TABLE 1

| Abbreviations | |
|---|---|
| 3GPP | 3rd Generation Partnership Project |
| CDF | Compression/Decompression Function |
| CoAP | Constrained Application Protocol |
| CRC | Cyclic Redundancy Check |
| D2D | Device to Device |
| ES | End-System |
| IETF | Internet Engineering Task Force |
| GUI | Graphical User Interface |
| HC | Header Compression |
| HCC | Header Compression Context |
| HCD | Header Context Data |
| HCI | Header Compression Indicator |
| IP | Internet Protocol |
| IPv6 | Internet Protocol version 6 |
| L2 | Layer 2 |
| LC | LPWAN Compressor |
| LPWAN | Low Power Wide Area Network |
| LSB | Least Significant Bit |
| MAC | Media Access Control |
| MO | Matching Operator |
| MSB | Most Significant Bit |
| MTU | Maximum Transmission Unit |
| ND | Neighbor Discovery |
| PC | Protocol Context |
| TMGI | Temporary Mobile Group Identity |
| TV | Target Value |
| URI | Uniform Resource Identifier |
| WG | Working Group |

Constrained networks, such as Low Power Wide Area Networks (LPWANs), 6LoWPAN, etc., are wireless networks that have challenging constraints but may cover a wide area of up to a few kilometers. These networks offer connectivity to IoT devices that require low bandwidth, low power consumption, and low message rates. As a result, LPWAN networks may be ultra-dense with thousands to tens of thousands of devices. The network topology typically is one of a star or star-of-star configuration, and the protocol stack is minimized, e.g., where the application layer is hard-wired to the Media Access Control (MAC) layer and thereby there is not a network layer per se. The devices themselves may be constrained as well, and can have sleep states to extend battery life of at least ten years on a coin cell battery.

Work in the Internet Engineering Task Force (IETF) around LPWAN has focused on incorporating Internet Protocol version 6 (IPv6) into LPWAN due to the proliferation of IoT devices and the need for IPv6 connectivity. This work allows IoT devices residing in a LPWAN network to be addressable from the Internet. The difficulty with the work entails fitting an IPv6 packet with a Maximum Transmission Unit (MTU) requirement of 1280 bytes against the LPWAN payload size, for example, of as small as tens to hundreds of bytes.

One focus is on header compression of IPv6, UDP, and CoAP protocols. With this work, the focus has been on static context stored on the devices and gateways. These "contexts" are lists of rules that define how the individual protocol headers are compressed in the device and decompressed at the gateway, or vice versa, for bidirectional communications. The context is static and stored on the device prior to deployment. Then the gateway is made aware of the context by some provisioning protocol, which is not yet specified. See LPWAN Static Context Header Compression (SCHC) for IPv6 and UDP, draft-ietf-lpwan-ipv6-static-context-hc-00.

Initial work in the IETF LPWAN WG has focused primarily on header compression and packet fragmentation of IPv6 packets. This combination of work allows IPv6 packets to be compressed and fragmented to fit into the smaller payload size of a LPWAN message or packet. With concerns to header compression, the initial focus has been on static context kept between End-Systems (ES) and an LPWAN Compressor (LC) as shown in FIG. 1. The term LC is used in the IETF SCHC draft to refer to a gateway and these terms are used interchangeably. These header compression contexts are a list of rules that define how individual protocol headers (e.g. IPv6, UDP, and CoAP headers) are compressed in the ESs and decompressed in the LC. Note that the rules provide for compression/decompression mechanisms and therefore, the rules support bidirectional communications at both ends. In other words, both the ES and the LC can have a compressor and a decompressor that access the same header compression context to support bi-directional communications with header compression. The header compression context is static and pre-provisioned on the ES. Then the LC is made aware of the header compression context by some provisioning protocol, which is not yet specified. As a result, the same context as the one provisioned on the device is stored at the LC as well to enable communications with header compression.

Within the header compression context, a set of rules are used to indicate how protocol headers (e.g. IPv6/UDP/CoAP headers) are compressed and decompressed. Each rule contains a list of headers with a Target Value (TV), a Matching Operator (MO), and a Compression/Decompression Function (CDF). Upon receiving a packet from the higher layer, a compressor on the ES will check the headers of the packet against the rules in the header compression context stored locally. When a match is found for all the protocol headers, the rule id is sent with any values required by the CDF. If no match to a protocol header is found in any rule, the packet is dropped. The decompressor then reconstructs the headers based on the rule id provided and the associated CDF for the rule.

The provisioning and management of these header compression contexts in both the devices and gateway can be problematic as the number of devices increases in the network. Each device must be provisioned with a full set of header compression contexts that include network parameters prior to deployment and some of the network parameters such as IPv6 addresses must be unique in a system with thousands to tens of thousands of devices. Furthermore, the gateway must be provisioned with the exact header compression contexts for each device, which complicates the header compression context management.

Remote environmental sensors, for example, are increasingly important in monitoring the levels of hazardous pollutants in the environment. One potential use of remote sensing is for the case of a catastrophic event in which a pollutant such as radiation is released into the environment. As radiation is hazardous to human health, remotely monitoring the levels of radiation released into the air plays an important part in determining the suitability of human habitat within the affected and surrounding areas. After such an event occurs, remote sensors are installed in the affected and surrounding areas and periodic measurements are reported back to a remote, centralized server far away. LPWAN technologies with its wide coverage area can be utilized in such an instance.

Figure 2:
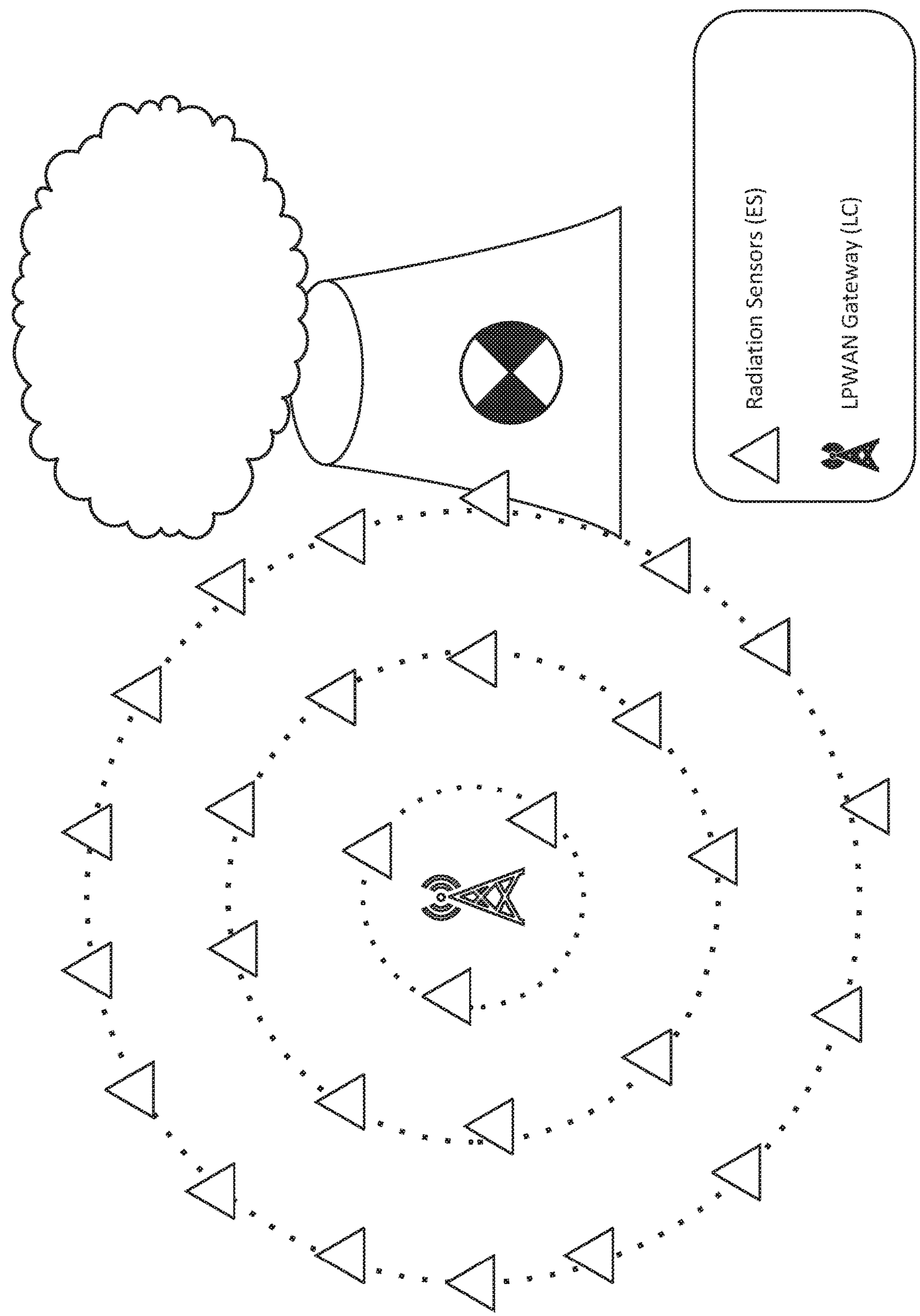
FIG. 2 illustrates an example LPWAN application using radiation sensors.

FIG. 2 shows a use case in which radiation sensors are installed after a nuclear reactor incident in which radiation was emitted into the surrounding areas. In FIG. 2, an LPWAN system is shown with one LC and many ESs. In practice, there may be several such systems to monitor the surrounding areas of the nuclear reactor. Radiation sensors are installed in the affected areas to monitor the levels of radiation during the cleanup effort as well as determine when the radioactive material have decayed to habitable levels. The sensors also report wind speed and wind direction to help determine if radiation is carried into other areas. The sensors use LPWAN technology to cover the large area and to operate over a long period of time if necessary. Periodically, each sensor reports its measurement to the LPWAN Gateway, which then aggregates the results and relays them to some remote server for continuous monitoring.

The use case of FIG. 2 shows some drawbacks to using static header compression due to the need to provision and manage the large number of contexts. Each device must be provisioned with a full set of header compression contexts that include network parameters prior to deployment and some of the network parameters must be unique in a system with a large number of devices. Furthermore, the gateway must be provisioned with the exact header compression contexts associated with each device, which complicates the header compression context management. In times of emergencies, a more dynamic header compression mechanism can be beneficial to deploy the sensors and let the system manage the header compression contexts. Network addresses do not need to be provisioned prior to deployment and the gateway is allowed to manage the use of the addresses efficiently should devices fail and are decommissioned. This allows the radiation sensors to be deployed quickly to avoid unnecessary exposure of the workers to radiation.

To make header compression more efficient in constrained networks, a Header Compression Indicator (HCl) may be used to signal various header compression operations, and used with a Header Context Data (HCD) format to communicate header context information and parameters.

An HCl header, for example, may be piggy backed onto a standard network message to enable header compression between a device and a gateway in the network to minimize message overhead. The indicator may be used to trigger the creation of a header compression context dynamically or for updating such contexts, as well as identifying what context is to be used when headers are compressed. The HCD format may be used to specify an encoded way to convey header option information and their corresponding data used in the management of the header compression contexts.

For example, HCl headers may be included in the messaging by which a device joins a network, whereby devices sending and receiving the HCl headers dynamically create header compression contexts. In this way, context creation overhead is minimized and is made as a part of existing operation. No new messaging is introduced. Contexts can also be deleted once they are no longer required.

Similarly, protocols may be augmented to add header compression context update and retrieve methods, allowing for the header compression contexts to be updated through methods to make the context dynamic should operations change. The update method may be incorporated as part of existing messaging between devices and gateways, to minimize the message size overhead. Similarly, contexts may also be retrieved.

The dynamic header compression mechanisms described herein may be used within a constrained network such as LPWAN where the message size is limited. However, they may also be used in other networks where header compression is utilized to reduce the message size or for other reasons. The example compact encoding of both the HCl and the HCD reflect the constrained nature of networks such as LPWANs and 6LoWPAN. In less constrained environments, these encodings may be relaxed to provide for more flexible operations, e.g. to support many other protocols.

Figure 3:
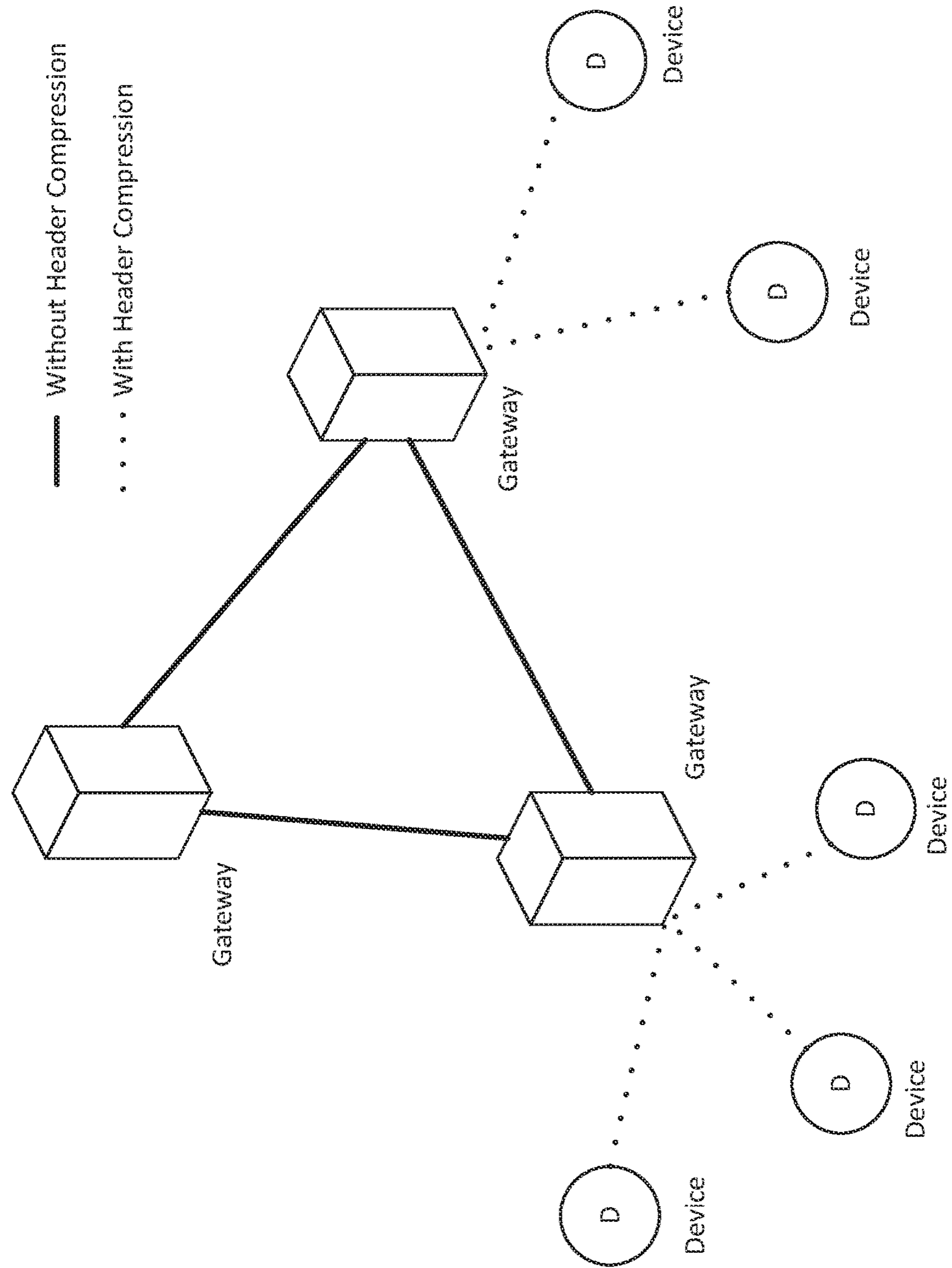
FIG. 3 is a system diagram of an example of communications with and without header compression.

Header compression may be performed between a device and a gateway in the network where each has agreed on one or more compression/decompression rules, e.g., as described by header compression contexts. The header compression contexts may be stored in non-volatile memory of the device, the gateway, or both. FIG. 3 shows an overview of where header compression is performed in the network. Bidirectional communications occur between devices and gateways using header compression while gateways communicate to other gateways using traditional IPv6 messages.

Messages are passed from higher layers to the compressor in the device, which resides under the Network Layer and above the MAC Layer in LPWANs. The decompressor also resides at the same location as the compressor in order to support bidirectional communications. The agreed upon header compression context is used to encode the message and the compressed message is sent to the gateway. The decompressor at the gateway decodes the compressed message into an uncompressed message by using information in the header compression context. Some header parameters may be determined after decompression and hence, the decompressor may need to calculate certain header values. These header parameters include the length of the decompressed message and a calculated CRC for the message. The provisioned information may be made through a profile created on the gateway for certain message traffic.

Figure 4:
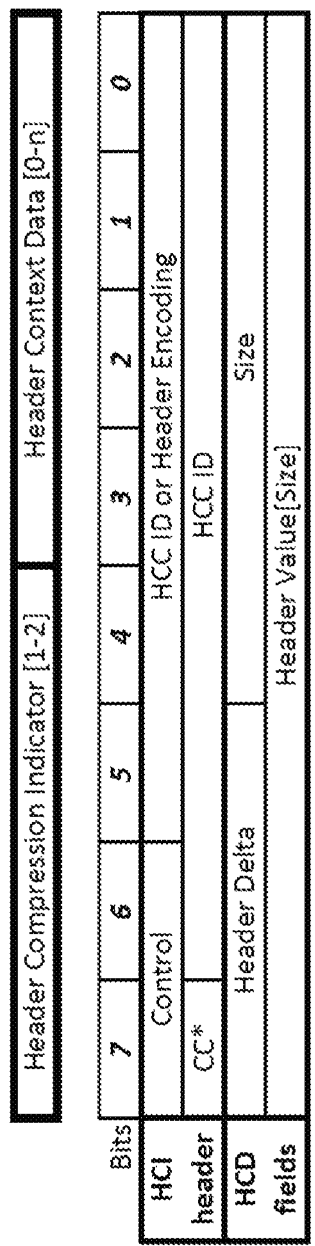
FIG. 4 illustrates an example Header Compression Indicator (HCl) header and header context data format.
Figure 6:
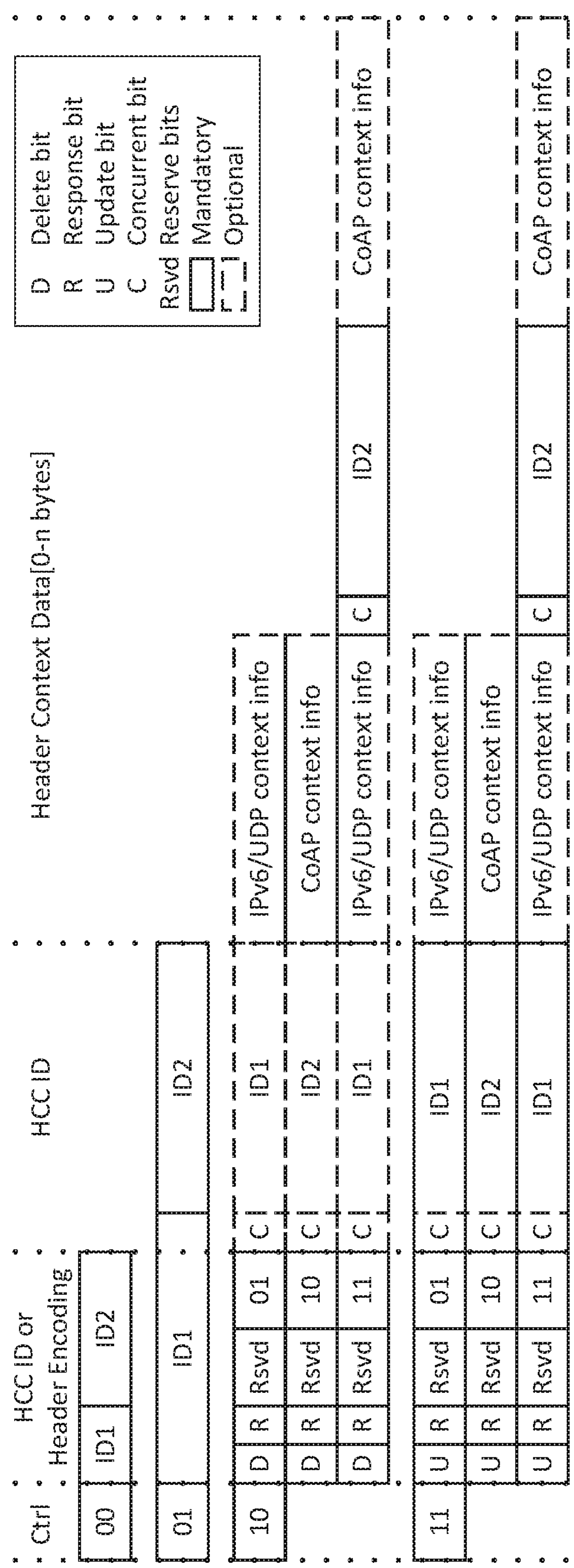
FIG. 6 illustrates an example HCl with header context data combination details.

An HCl header may be use for different modes of operation, e.g., by the use of control bits, as shown in the example of FIG. 4. Based on these control bits, the information included in the HCl header and the HCD fields can vary as shown in FIGS. 5 and 6. In this example, the MSB of the control bits indicates the use of header compression (MSB=0) or the modification of information in a header compression context (MSB=1). In other words, when MSB=0, the message sender is indicating header compression is used and decompression of the message is required. When the MSB=1, the message sender is indicating that some HCC management is required, e.g. the update of the destination IPv6 address. Due to the modes of operation, the remaining bits in the HCl header can be encoded so the meaning of each bit may be different. For example, bit 7 of the second byte of the HCl header can have three uses: 1) when Control=00, it does not exists since one byte is sufficient for the HCl header; 2) when Control=01, it represents the Least Significant Bit (LSB) of HCC ID1; and 3) when Control=10 or 11, it represents the Concurrent bit. As a result, some figures may not show these permutations.

FIGS. 5 and 6 show the possible uses of the HCl header and the HCD fields. Similar to the HCl header, the information in the Header Context Data fields depend on the Control bits. The HCD fields are required when the MSB of the Control bits is 1. The information provided by the HCD fields are used to create or update information in the HCC.

An HCl header may be added to the MAC payload of a LPWAN packet to signal the modes of operation when header compression is utilized in the message. It may be followed by the Header Context Data fields that define the header compression details to create or update the HCC. FIG. 4 shows one way the HCl header can be defined: a 2-bit Control field indicating the mode of operation for header compression, a 6-bit HCC ID or Header Encoding field, and a 7-bit HCC ID required for some modes of operation with the CC (Concurrent) bit in the MSB position of the byte. In addition, the Header Context Data format includes Header Delta, Size, and Header Value fields that are described below. As such, the HCl header can be 1 or 2 bytes while the HCD fields can be up to n bytes, where n depends on the numbers of headers present as well as the values of the headers themselves.

The Control bits can indicate the modes of operation which includes the creation or deletion of header compression contexts (10), the update or retrieval of information from a header compression context (11), or specifying what header compression context to use (00 or 01). Once a header compression context is created, an HCC ID can be assigned by the gateway for the device to use in compressing headers of future messages. The device can then send messages with an HCC ID that points to the header compression context that was used to compress headers in the message. The gateway can use the HCC ID to extract information saved in the header compression contexts to construct the decompressed message that contains the protocol headers and their associated values. It can then send the reconstructed IPv6 message, which includes the IPv6, UDP, and CoAP headers, through the IPv6 infrastructure where it is routed to the appropriate destination.

FIG. 5 shows the possible encodings of the 6-bit Header Encoding field. In conjunction with the Control bits, the Header Encoding field specifies the specific operation to be performed. When Control=10, the Del bit can be used to specify whether the operation is a Delete HCC operation (Del=1) or a Create HCC operation (Del=0). For the creation of the HCC, the presence or absence of the second byte of the HCl header can depend on whether the header compression context is new or if it is a copy of an existing HCC. If the HCC indicates that the context is new, i.e., that it should be created, then the second byte is omitted as the gateway can assign the HCC ID; if the new HCC is a copy of an existing HCC, the ID of the existing HCC is included in the second byte. This allows a device to create a new HCC based on information found in an existing HCC without transmitting all the information found in the existing HCC. The device may need to transmit a header value that is different in this HCC from the existing HCC. Next, the Protocol Context (PC) bits can identify what HCC(s) are created or deleted and they can operate independent from each other so both IPv6/UDP and CoAP HCCs can be created at the same time.

The Rsp (Response) bit can have a dual purpose: for requests, setting the Rsp bit to "1" requests the gateway to return a response with details of the HCC; for responses, the presence of the Rsp bit indicates a response to the corresponding create or update request. Note that even if the Rsp bit is set to "0" in a create/update request, a response is still returned but without any HCC information. The Rsp bit can be used whenever a device requests the gateway to provision network parameters during the creation of an HCC and wants the gateway to send such information in the response. However, in some cases, the device may not need to know the contents of the HCC if it communicates to the same central server through the same gateway. For example, a particular LPWAN is set up in which a gateway routes all communications to the same cloud server and the device communicates to that gateway. In this case, devices that connect to this gateway can have their messages automatically sent to the central server. The devices do not need to know the IPv6 address of the central server—it just needs to send the message to the gateway and let the gateway insert the central server's IPv6 address while decompressing the message received from the device. Setting the Rsp bit to "0" can indicate to the gateway that it does not need to return any context data to the device. This further optimizes communications by not including unneeded data and thereby, reducing the message size. When the gateway sends the response of the status of an HCC create request, the Rsp bit can be set to "1". Note that the Rsp bit can also apply to the HCC update method as well.

As shown in FIG. 5, there are two header compression contexts defined that are noted ID1 and ID2. HCC ID1 specifies the IPv6 and UDP headers while HCC ID2 specifies the CoAP headers. The number of header compression contexts depend on the number of protocols supported and how the context are created and used. Having two sets of protocol headers in this case provide more flexibility as the IPv6/UDP headers are typically more static in nature while the CoAP headers are more dynamic. The contexts can then be independently used. An example definition of a header encoding is shown in FIG. 5 allows for the inclusion of additional protocol headers through the use of the Reserved bits. With less constrained networks, more protocols can be supported by expanding the size of the HCl header.

Once a header compression context is created, devices can update or retrieve information stored in the HCC by setting the Control bits to "11" and specifying the Upd (Update) bit accordingly. This feature can be used to modify information stored in an HCC due to changes in the system or network, e.g. if the destination IPv6 address changed. Setting the Upd bit to "1" can be used for updating an HCC and setting a value of "0" can be used for retrieving the HCC for a specific HCC ID. The PC bits specify which protocol HCC to update to or retrieve from. When in this mode of operation, an HCC ID can be specified in the second byte of the HCl header to indicate which HCC to perform the update or retrieval on. If both PC bits are set, then both HCC ID1 and ID2 can be included as shown in FIG. 6.

When a device wants to send a message with compressed headers, the MSB of the Control bits can be set to "0" and the LSB of the Control bits can determine whether short HCC ID or full HCC ID is used. The HCC ID can be represented as 7 bits and as a result, it can support up to 128 header compression contexts. If a device uses a small subset of available HCCs, e.g. up to 4 IPv6/UDP and up to 16 CoAP contexts, then the device can use Short HCC mode (Control=00). In this mode, the HCl header can consist of one byte: 2 bits for Control, 2 bits for HCC ID1, and 4 bits for HCC ID2. In LPWANs, this mode may be sufficient as devices may need a small number of contexts. The gateway in this case can assign the HCC IDs in the reduced range so devices can use the short HCC ID mode. Note the HCC ID assignments are on a device basis so each device can have its own HCC ID set. If the device needs more HCCs beyond those supported by Short HCC mode, then Full HCC mode is selected, which provides the device up to 128 header compression contexts for each set of HCCs (e.g., 128 IPv6/UDP and 128 CoAP contexts). Full HCC mode, however, requires 2 bytes: 1 byte for the Control bits and the first 6 bits of HCC ID1 and another byte for the LSB of HCC ID1 and 7 bits for HCC ID2. The idea is that once HCCs are created, communications can be simplified by sending the HCl header without other header details. The gateway can then reconstruct the message using data in the contexts identified by the HCC IDs. The HCC, therefore, contains all information the gateway needs to reconstruct the protocol headers.

The Header Encoding and Header Context Data fields may represent different data at different times depending on the setting of the Control bits. FIG. 6 shows the different information for the HCl header and Header Context Data fields based on the values of the Control bits. When Control="10", the Del and PC bits may determine what information is included in the HCl header and Header Context Data fields that follows. Similarly, when Control="11", the Upd and PC bits may determine the information that follows the first byte of the HCl header. Notice the introduction of the D, R, U, and C bits when Control is either "10" or "11". These are the same bits as those shown in FIG. 5 but due to space constraints, they are reduced to a single character. Tight encoding benefits constrained networks by, for example, minimizing the size of the information sent over the network. In less constrained networks, the encoding can be expanded to offer more combinations of supported protocols and allow for more operating modes.

The Control bits encodings are optimized for LPWAN operation by trying to minimize the number of bits in the HCl header. For system that are less resource constrained, the Control bits can be increased to offer more modes of operations. The creation and deletion of HCCs were multiplexed together; similarly, the update and retrieval of HCCs was multiplexed as well. In this example, the Control bits are limited to 2 bits. Expanding the Control bits to more bits allow for more independent operations so 1 bit can be assigned to each operation on the HCCs: create, retrieve, update, and delete. With this expansion, parallel operations of creating one HCC, updating a second HCC, and deleting a third HCC are possible. Another alternative is that when the first bit of the Control is set to 1, then the Control field is considered to be 4 bits. The 3 LSBs of the field can then be used to define different actions, which may be concurrent or not, that the receiver can act upon accordingly.

The format of the Header Context Data fields are encoded to minimize the message size as much as possible. The Header Context Data fields are conditional and are available when the Control field of the HCl header has the MSB set to 1 (e.g., the Control field is either 10 or 11). The encoding has the format shown in FIG. 7, which shows one Header Context Data unit. A HCD unit represents one protocol header and its value. Multiple HCD units may form one protocol header and its value if the Size field contains the value 29 as described below. The HCD unit can consists of a 3-bit Header Delta, a 5-bit Size to represent the size of the Header Value in bytes, and 0 to 29 bytes of Header Value. The Size field can have four special, encoded values (non-encoded values from 1 to 29 represents the header value size in bytes) as described below:

A size field value of 00000 (zero) indicates the presence of a header with a value of 0 without sending the Header Value. When Size is set to 00000, there is no Header Value that follows as it is implicitly inferred to have the value "0". A new Header Delta follows instead of a Header Value. The decompressor can then add a value of zero for the header when reconstructing the message.

A size field value of 11101 (29) refers to the header having a value greater than 29 bytes. The first 29 bytes follow this encoding while the continuation of the header value is found in the adjacent Header Context Data unit. A new Header Delta of 0 can follow the 29 bytes and provide the next or continued header value, which is concatenated with the previous header value. There may be one or more of these encodings if the header value is sufficiently long, e.g. a long URI. However, in LPWAN, it is not anticipated that such encoding are used as the goal is to minimize message sizes. This encoding may be useful in less constrained networks.

A size field value of 11110 (30) indicates that the decompressor is informed to skip the current selected header and advance to the next header. This encoding supports the next header number being more than 7 slots away from the current header. More details are provided below on how this encoding works when the Header Delta calculation is discussed.

A size field value of 11111 (31) indicates that, when the Header Delta is "111", that the end of the header context data for the current HCC ID is reached. This is referred to as the "HCC Delimiter" and is used to separate context information when multiple HCC IDs are accessed. In the absence of multiple HCCs, it signifies the end of the header compression details. The HCC Delimiter may be omitted if no data follows the header compression details.

To enable the Header Delta calculation, each IPv6/UDP and CoAP header may be assigned a numerical value as shown in Tables 2 and 3. These numbers are used for the example header compression operations described herein, and should not be confused with the associated protocol's header option number. The tables list headers pertinent for header compression and other headers such as length and checksum are omitted as they are determined by the decompressor at the time of message reconstruction.

The header compression (HC) numbers shown in Tables 2 and 3 can be used to generate the Header Delta values. The 3-bit Header Delta is computed by subtracting the previous HC number from the current HC number. For the initial calculation, the previous HC number is zero. For example, if the first header to encode is the source address, then the calculation would be 5-0 and the Header Delta value would be 5. Then if the next encoding is the Destination Address, the Header Delta calculation is 6-5 and 1 will be the Header Delta value. If the next header is located more than 7 slots away from the current header, then the Header Delta value can be set to "111" and the Size value set to "11110". This skips the header that is 7 slots from the current header to get closer to the next header. For example, if the current header is "If-Match" and the next header to compress is "Content-Format", then the skip header feature can be used. In this case, the Header Delta calculation will be 14-6 but 8 does not fit into a 3 bit field. As a result, the Header Delta can be encoded to "111" and Size can be set as "11110". Then the next Header Delta calculation will be 14-13 to generate a value of 1. The use of the header skip mechanism can be minimized by assigning the header numbers in Tables 2 and 3 appropriately. One method is to set frequently used headers no more than 7 slots apart. Another method is to group related headers near each other.

TABLE 2

| Header Number for Header Delta Calculation - IPv6 & UDP | |
|---|---|
| IPv6/UDP Options | HC # |
| Table Version | 0 |
| IPv6 Version | 1 |
| Traffic Class | 2 |
| Flow Label | 3 |
| Hop Limit | 4 |
| Source Address | 5 |
| Destination Address | 6 |
| Source Port | 7 |
| Destination Port | 8 |

TABLE 3

| Header Number for Header Delta Calculation- CoAP | |
|---|---|
| Coap Options | HC # |
| Table Version | 0 |
| CoAP Version | 1 |
| Type | 2 |
| Code | 3 |
| Token | 4 |
| Message ID | 5 |
| If-Match | 6 |
| Uri-Host | 7 |
| ETag | 8 |
| If-None-Match | 9 |
| Observe | 10 |
| Uri-Port | 11 |
| Location-Path | 12 |
| Uri-Path | 13 |
| Content-Format | 14 |
| Max-Age | 15 |
| Uri-Query | 16 |
| Accept | 17 |
| Location-Query | 18 |
| Block2 | 19 |
| Block1 | 20 |
| Proxy-Uri | 21 |
| Proxy-Scheme | 22 |
| Size1 | 23 |

The CoAP protocol header options shown in Table 3 captures existing header options. The design of what options are included in the table can be optimized for a particular application. For example, in LPWAN, the Proxy-URI, Proxy-Scheme, Etag, Observe, etc. may not be used. For this application, those header options may be removed from the table without loss of functionality. A way to support using various versions of the tables shown in Tables 2 and 3 is to use the Table Version specified in header option 0. When an HCC is created, the table version can be specified so the gateway knows what header options are available. Using this mechanism, the gateway can manage the different table versions and a standard can be defined for what options are included for a particular version.

Figure 8:
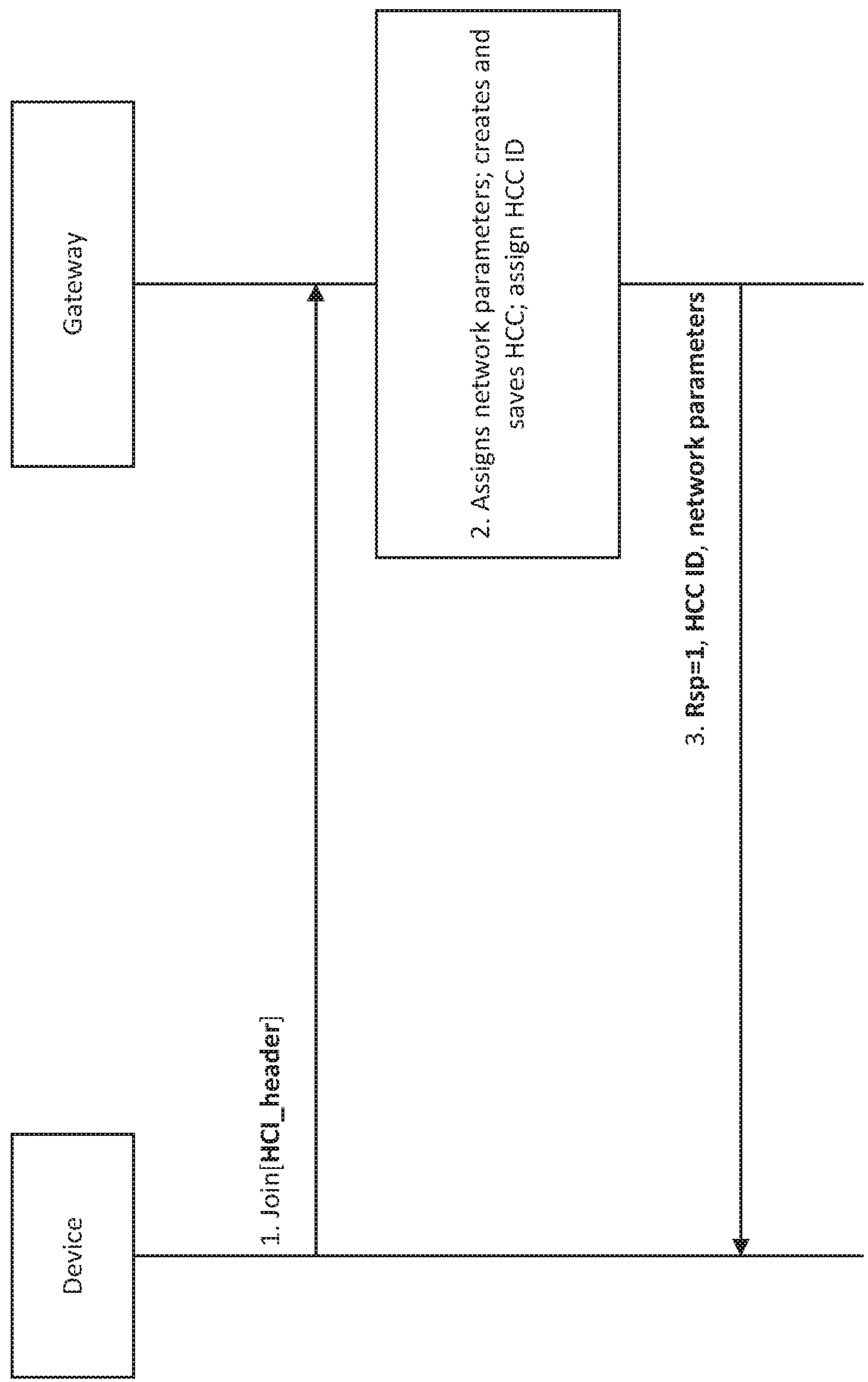
FIG. 8 is a call flow of an example method for header compression context creation.

A header compression context is first created between the sending and receiving entities. This can be achieved whenever a device joins the network and includes an HCl header, e.g., with the Control bits set to "10" and an appropriate 6-bit Header Encoding field. Including the HCl header as part of the device's join process limits the header compression context creation overhead while providing built-in optimization. Typically, a join process includes the provisioning of a network address and this can be used to create the header compression context without any additional overhead. When a device is deployed and is initiating a request to join the network, the gateway can provide a network address to the device with which to use for future communications. This network address can include a globally unique IPv6 address in addition to any other address the device needs in order to communicate in the LPWAN. The gateway can be provisioned with a set of IPv6 addresses with which to assign to the devices. At this point, a header compression context can be created for the device by the gateway that includes the source and destination IPv6 addresses and ports. If the device provides information for the HCC in the Header Context Data fields, the gateway can use the provided information by the device to create the HCC. FIG. 8 shows a method by which a device may create a header compression context.

In step 1 of FIG. 8, when a device is deployed, it can first join a network by sending a message to the gateway. An HCl header in which the Control bits are set to "10" is included in the MAC payload of this message to request the gateway to create a header compression context. The device sets the LSB of the PC bits to "1" to create an IPv6/UDP context and if the device was provisioned with network information, it can include the network parameters in the Header Context Data fields. Otherwise, the HCD fields are empty and the gateway can provide such information, which is the case in this example. Similarly, the device can also request to create a CoAP HCC by setting the MSB of the PC bits to "1" and provide the CoAP header values in the Header Context Data fields. When both IPv6/UDP and CoAP HCC creations are requested, the Header Context Data fields can first contain the IPv6/UDP values and then followed by the CoAP values. FIG. 6 provides possible permutations of the protocol context bits and the presence of data in the Context Header Data fields.

In step 2, the gateway receives the request and identifies the need to create a header compression context due to the presence of the HCl header. If requested, the gateway can assign network parameters such as the source IPv6 address and port number to the device. In addition, it may also assign destination IPv6 address and port number if that information is configured in a policy or through some other means on the gateway. The LPWAN may be set up such that this information is provisioned to the gateway and all devices that connect to the gateway can send messages to the same server. If the network parameters are provided by the device, then the gateway stores that information in the HCC for the device. An HCC is created in which the gateway saves all the network parameters locally and assigns an HCC ID. A similar method is repeated to create the CoAP header compression context if it was enabled and a separate HCC ID is generated. The gateway maintains separate HCC IDs to allow more flexibility to the device. The IPv6/UDP context values tend to be more static in nature while the CoAP context values may have more combinations in use. For example, the device may need to send messages to one or a small handful of servers. On the other hand, a device may have multiple resources which require different URIs and need more combination of contexts as a result.

In step 3, once contexts are saved and HCC IDs are assigned, the gateway may respond to the device with this information. In some cases, the device may not need to know certain information, e.g. those that the device provided in the request of step 1. In those cases, the gateway may not include the data in the response to minimize the message size. If the device communicates to just this gateway, it may not even need to know the network parameters the gateway assigned since all messages are communicated between the device and this specific gateway. The device can set the Rsp bit of the Header Encoding field to "0" to indicate the gateway does not need to return any context information in the response to minimize message size.

After the HCC has been created and an ID is assigned, the gateway can return the HCC ID and any requested information in the response to the device. The gateway can return data in the response if the Rsp bit was set to "1" in the request or the gateway provisioned data that was saved in the HCC. It may also return data in the response if the gateway overrides information provided by the device when saving it to the HCC. For example, if a device provides an IPv6 address in the request and the gateway had to change it to another address due to a duplicated address, the gateway can include the new address in the response. For data provided by the device and accepted by the gateway, the information may not be returned in the response.

During the creation of an HCC, the device can include network parameters it was provisioned prior to deployment. Alternatively, it can also allow the gateway to assign such network parameters if the system is configured. A third method is for the device to supply certain parameters while the gateway assigns other network parameters. This situation exists when a device is provisioned with the destination address and port number as well as the source port number but not a source address. In this case, the gateway can assign the device a source address. An HCC is then created from information supplied by both the device and the gateway.

Note that when creating a new HCC, the device does not provide an ID for the HCC as the management of HCC IDs are reserved for the gateway. As a result, the gateway assigns the HCC ID, which lessen the burden of HCC ID management from the device. In cases where devices are not as constrained, then devices can provide the HCC IDs instead of letting the gateway manage them. If gateways are managing the HCC IDs, then a mechanism is provided in which devices can specify an HCC ID when issuing a HCC create request to copy information from an existing HCC into a new HCC. Typically, the device can supply new header information to put into the new HCC in addition to the information copied from the existing context. This mechanism allows the device to reuse header compression information from an existing HCC for use in the creation of a new HCC while removing the need to supply duplicate information in the HCC create message to the gateway.

Once contexts are created, they can be removed from the gateway by sending an HCl header in which the Del bit is set. The device also need to include the PC bit(s) as well as the HCC ID to be deleted. This supports the case where an HCC is no longer needed, e.g. when a destination server is no longer in operation and the associate HCC can be deleted.

Figure 9:
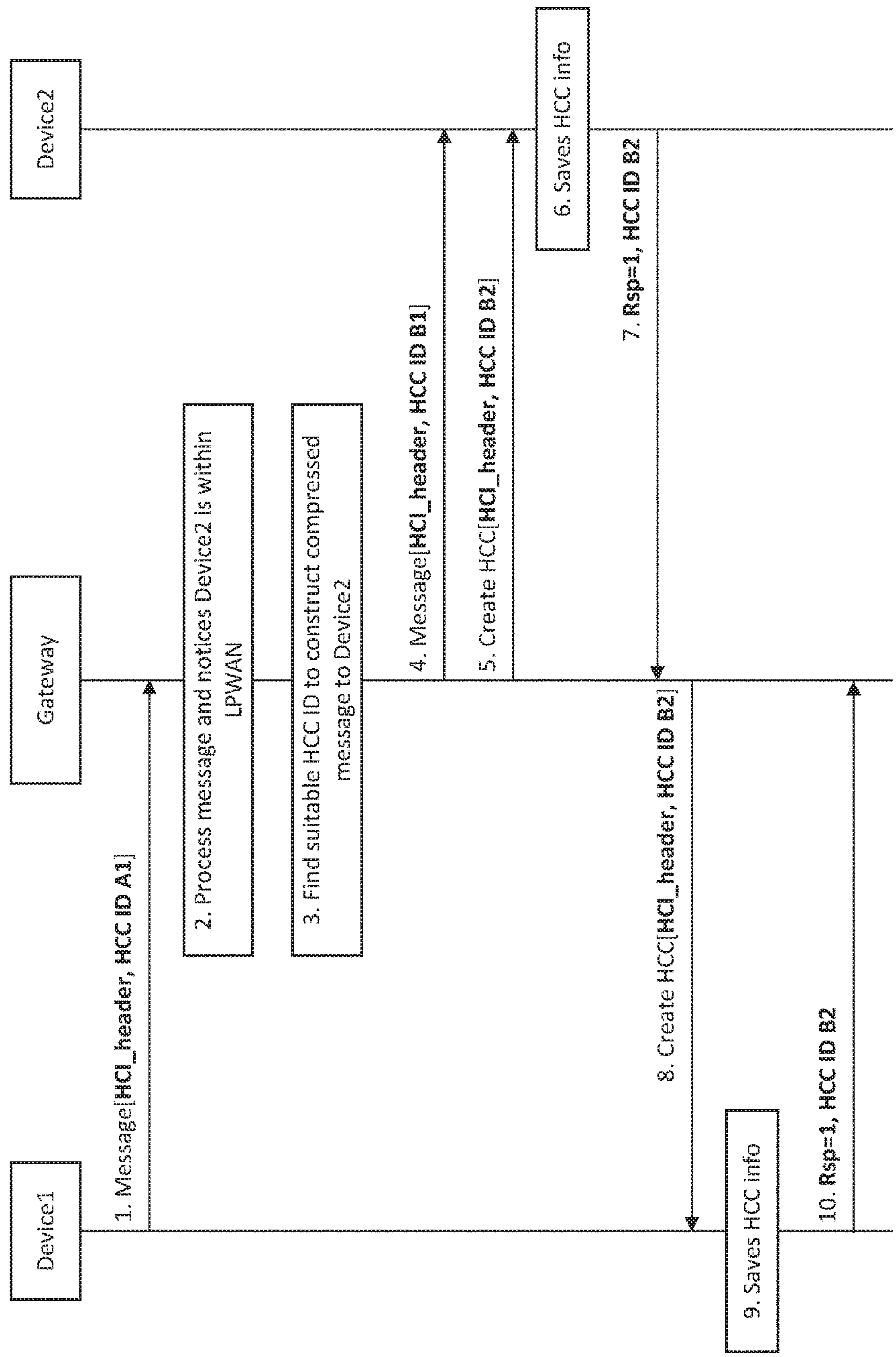
FIG. 9 is a call flow of an example in which a gateway creates a header compression context.

In certain cases, the gateway can proactively create header compression contexts on a device, optionally when it detects that two devices are communicating with each other within the LPWAN. This can allow the devices to communicate directly with each other using the header compression context indicated by the gateway. FIG. 9 shows such a case in which device1 is sending a message to device2. The gateway receives the message and notices that device2 is connected to the LPWAN. The gateway decompresses the message from device1 and reconstructs a message to device2 using the HCC ID it finds for device2, in this case B1. The gateway then proceeds to create a new HCC on device2 in which to decompress messages from device1. Similarly, the gateway creates a new HCC on device1 using the same HCC ID B2. Once both HCCs are created on the devices, future communications can occur directly between device1 and device2. Note this feature is available if the devices support device to device communications.

In step 1 of FIG. 9, Device1 sends a data message to device2 using HCC ID A1. This HCC is valid between device1 and the gateway.

In step 2, the gateway processes the message and notices that device2 is connected to the LPWAN.

In step 3, the gateway then decompresses the message sent by device1, locates the HCC ID for device2, and reconstructs the decompressed message into a new message to send to device2 using HCC ID B1. The message is compressed with HCC ID B1, which is valid between the gateway and device2.

In step 4, the gateway sends the message generated in Step 3 to device2.

In step 5, due to both devices supporting device to device communications, the gateway creates a new HCC ID B2 on device2. Previously, it was mentioned that an HCC ID is not included in the HCC create request since the HCC ID was managed by the gateway. In this case, the gateway is sending the HCC create request and therefore, it is allowed to include an HCC ID since it assigns the IDs.

In step 6, Device2 receives the HCC create request and saves the HCC information internally.

In step 7, Device2 responds to the gateway by providing the Rsp bit and includes HCC ID B2.

In step 8, the gateway sends an HCC create request to device1 with the same HCC ID B2 as it provided to device2. However, the address information in the HCC is reversed from that of the one in device2. For example, the destination address and port number on device1 is the IPv6 address and port number of device2. On device2, the destination address and port number is the IPv6 address and port number of device1. Similarly, the source IPv6 address and port number on each devices follows the same reasoning. Note it is assumed the lower layer addressing is handled appropriately since the devices support device to device communications.

In step 9, Device 1 saves the information in the HCC that was provided by the gateway In step 10, Device 1 returns a response with the Rsp bit set and the HCC ID B2 to acknowledge the creation of the HCC. At this point, device1 can send a message directly to device2 using HCC ID B2. The method of FIG. 9 involves the creation of HCC on the device that was initiated by the gateway. This method can also apply to the update of an HCC on a device based on, for example, the mobility of one of the devices. In this case, the gateway can update the IPv6 address of the mobile device in one of the HCCs stored on the second device.

Once a header compression context is created, it can be updated or retrieved at a later time using the HCC ID assigned to it and setting the Update bit appropriately in the request message. Typically, these cases occur when a change to the system results in a change to one or more network parameters, such as the destination address and port number. In such a case, the header compression context update procedure can be used to update those parameters for the indicated HCC ID.

Figure 10:
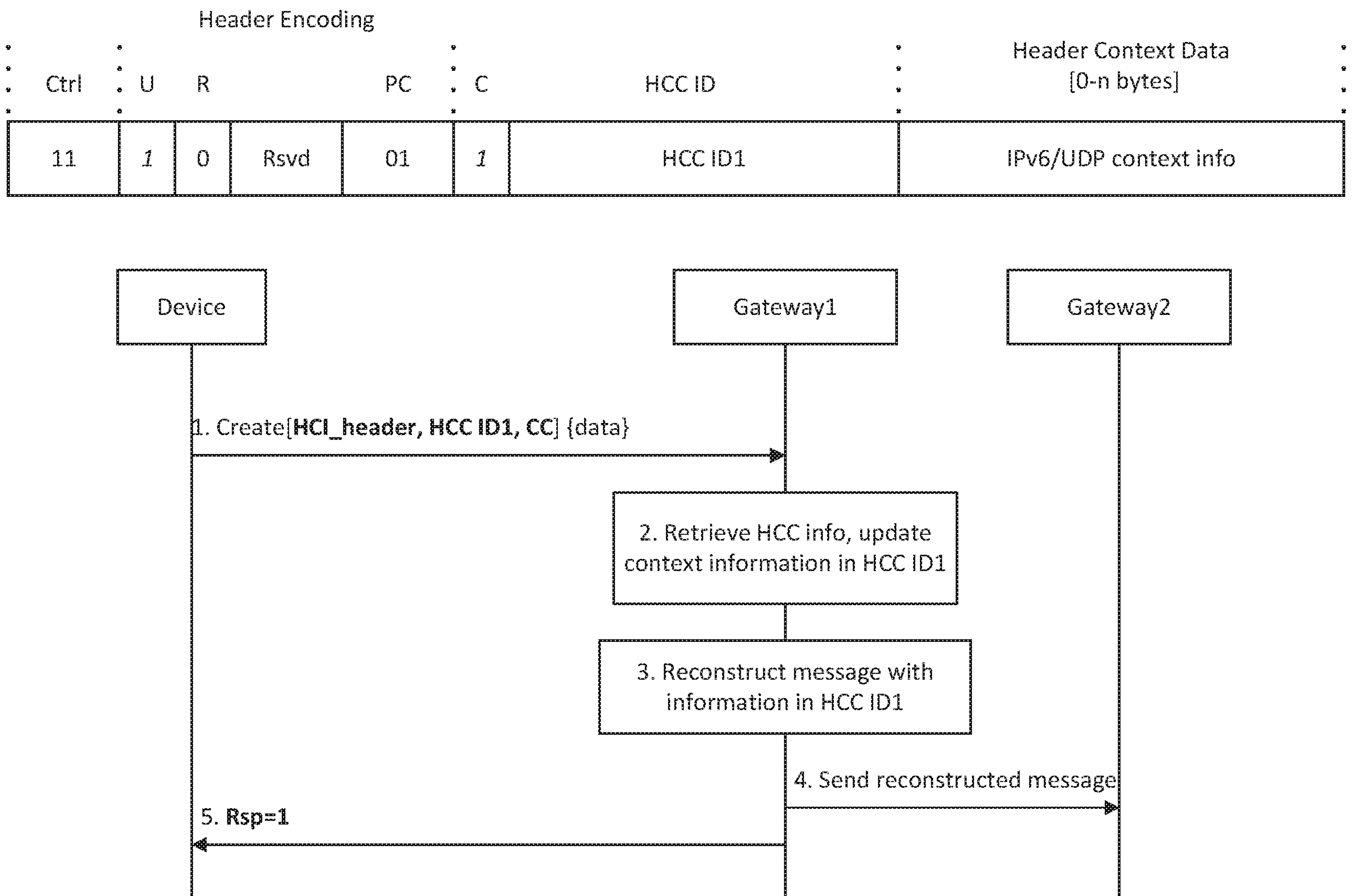
FIG. 10 is a call flow of an example where a context update is combined with normal messaging.

The update procedure can be performed standalone by the device sending a message with Control set to "11", the appropriate protocol context bits, and a HCC ID. However, the messaging can be optimized if the Concurrent bit is set as well. If two HCCs are being updated (PC=11), there can be two Concurrent bits, one for each HCC ID. Each HCC ID can be carried in a byte, 7 bits for the HCC ID and a single Concurrent bit. The Concurrent bit allows a device to perform an update to the context while also sending a message to the destination address. The gateway, upon receiving such a request, can first update the information in the HCC and then construct a new message based on the updates to that HCC. This optimization embeds the update method within a device's normal communications to the destination server and thereby minimizes the overhead incurred. FIG. 10 shows the header compression context update method as part of a device's normal messaging to a central server. Note the setting of the Update and Concurrent bits in the HCl header shown at the top of FIG. 10.

In step 1 of FIG. 10, the device sends a request with a measurement to a central server with an HCl header and HCC ID1. Previously, the device was informed to send future measurements to a new port number at the central server due to some reconfiguration. As part of the request message, the device sets the Update and Concurrent bits to "1" to trigger an HCC update and also to send the measurement to the central server.

In step 2, gateway1 receives the request, parses it to retrieve the header compression information, and updates the port number associated with HCC ID1.

In step 3, gateway1 proceeds to construct a new message with the updated information in HCC ID1.

In step 4, gateway1 sends the new message to Gateway2 for routing to the central server.

In step 5, gateway1 acknowledges the device by setting the Rsp bit to "1" that the request was successfully sent.

Figure 11:
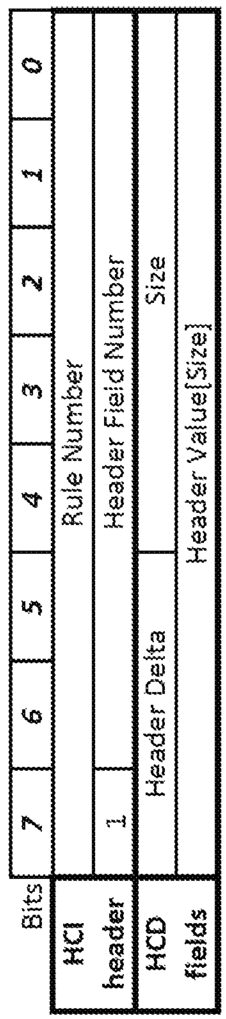
FIG. 11 illustrates an example modified HCl header and Header Context Data (HCD) to support updating a header compression context.

The HCC update method can be applied to the static header compression work described in the draft IETF LPWAN SCHC as well. In order to do that, the fields in the context rules can be assigned a numerical value similar to Tables 2 and 3. In addition, the HCl header can be modified as shown in FIG. 11 to allow for specifying which Rule Number and which Header Field to modify. The Rule Number is already being sent to the gateway by the device as described in the draft IETF LPWAN SCHC. The modification entails adding one byte that contains the Header Field Number after the Rule Number and up to n bytes for the Header Context Data that follows the HCl header to contain the Header Value for updating the HCC in the gateway. Again, a Header Delta may be used as described above. This modified HCl header is fully compatible with the static header compression context work as the additional information is appended to the Rule Number. If the device does not need to update the context, only the Rule Number is sent. The "1" in the Header Field Number byte serves as an indicator for the Update bit.

In addition to updating information in an HCC, the device can also retrieve data stored in the HCC. The device can send a request with the Control bits set to "11", the Update bit set to "0", the PC bits and the HCC ID of the HCC to retrieve from. In this case, the Concurrent bit is not applicable and is ignored by the gateway. The entire HCC can be retrieved if no Header Context Data is included in the request. The device can selectively retrieve certain header values by providing one or multiple headers using the Header Delta format with the Size field set to zero. In this mode, the gateway can interpret the Header Context Data as the list of headers to return in the response, which is also in the Header Delta format but this time with values associated with the corresponding headers.

Figure 12:
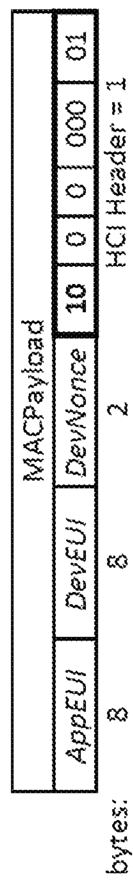
FIG. 12 illustrates an example join-request message in a LoRaWAN that includes a header compression context creation request.

Dynamic header compression context management may be incorporated with LoRaWAN's Join-request procedure. LoRa is a wide area network technology that is part of the LPWAN work in the IETF. LoRaWAN is the MAC layer protocol of the LoRa technology that provides an Over-the-Air Activation procedure in which end devices perform a join procedure to connect to the network. Prior to joining the network, the device is first personalized with various identifiers such as a globally unique end-device identifier (DevEUI), an application identifier (AppEUI), and an AES-128 key (AppKey). The device sends a Join-request message to the gateway with the provisioned identifiers to initiate the procedure. The gateway can return a Join-accept message if the device is allowed to join the network that includes a network identifier (NetID), an end-device address (DevAddr), and other technology specific parameters. The creation of header compression context can be incorporated into the join procedure by adding the HCl header to the Join-request message as shown in FIG. 12. The response to the Join-request is shown in FIG. 13 as the Join-accept message.

FIG. 12 shows information that may be included in the Join-request message after adding the HCl header. In this case, the device is requesting that a header compression context be created (Control="10", Del="0"), no response is necessary from the gateway (Rsp="0"), and the protocol context to create is IPv6/UDP context (PC="01"). This introduces a single byte to the Join-request message to create the context on the gateway.

Figure 13:
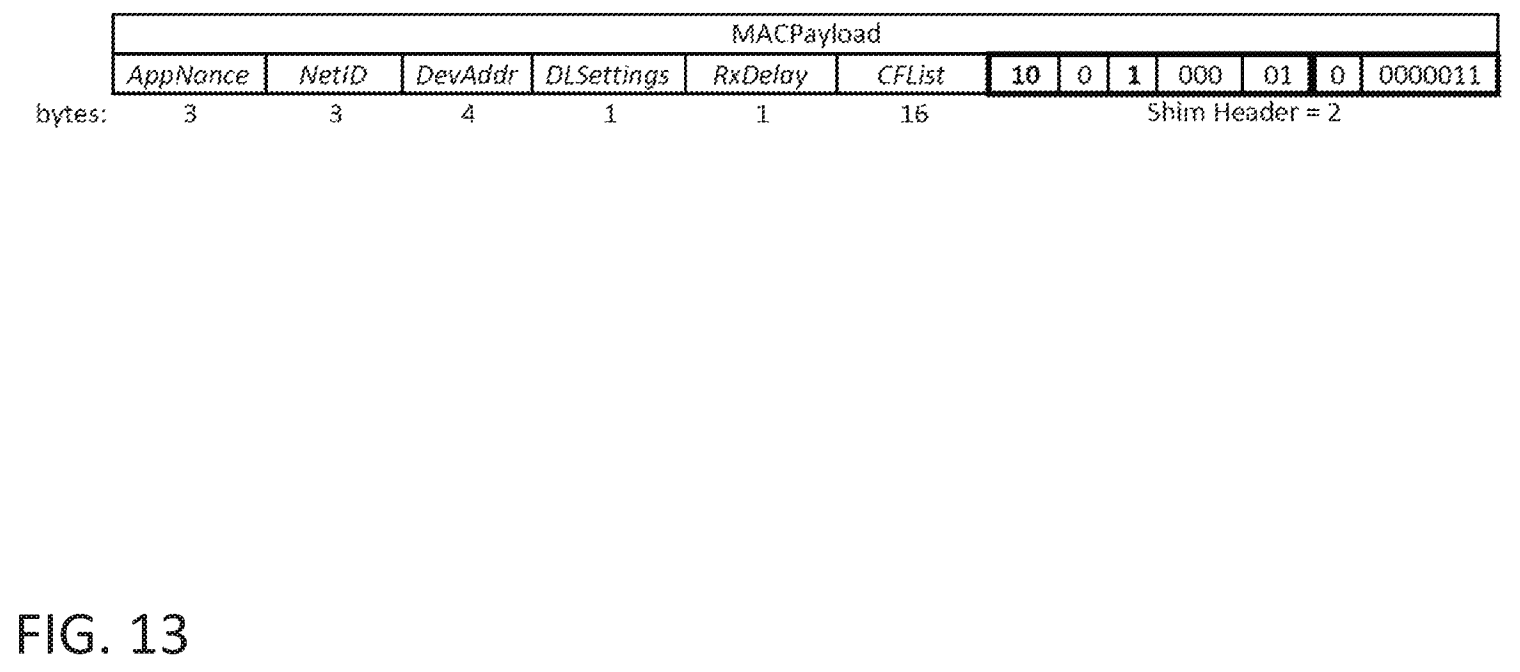

FIG. 13 shows an example of the Join-accept response to the Join-request message. The HCl header contains the following: Control=10 and Del=0 for a create HCC request, Rsp=1 to signify this is a response to the HCC request, PC=01 for IPv6/UDP HCC, and an HCC ID1=3. The response adds two bytes to the Join-accept message.

Simultaneous header compression context update and message transmission to a central server may be achieved using the concurrent bit. In this example, HCCs have already been created and the device wants to send a measurement to port number 57232 of the central server. FIG. 14 shows the contents of the HCl header and Header Context Data fields in which the device wants to update the port number in HCC ID1=2 and at the same time, send a measurement to the central server. This request requires 6 bytes: 2 bytes for HCl header and 4 bytes for Context Header Data fields in addition to the data sent to the central server.

The details are as follows in Table 4 (HD=Header Delta, HV=Header Value). Notice the use of the Header Delta's skip header feature for the Size encoding (value=11110) in Size1. The header numbers used in the Header Delta calculations refer to the IPv6/UDP headers provided in Table 2.

TABLE 4

| Param. | Value | Description |
|---|---|---|
| C | 11 | Update/retrieve context request (Control bits) |
| U | 1 | Request is update (Update bit) |
| PC | 01 | Update to IPv6/UDP context (Protocol Context bits) |
| CC | 1 | Concurrently update context and also send message to central server (Concurrent bit) |
| HCC ID1 | 2 | Update IPv6/UDP context #2 |
| HD1 | 7 | Current header value is 7 (0 + 7) |
| Size1 | 30 | skip this header |
| HD2 | 1 | Current header value is 8 (7 + 1) |
| Size2 | 2 | Header #8 (UDP destination port) has 2 bytes |
| HV2 | 57232 | Destination Port Number |

The concepts herein may be applied to 3GPP Device-to-Device (D2D) communications. 3GPP Device-to-Device (D2D) communications may use a ProSe (Proximity Services) Function, where the ProSe Function resembles a gateway in that it helps the UE devices to communicate directly with each other. ProSe Function may act as a gateway in establishing device to device communications by creating appropriate HCCs on the devices.

The ProSe Function may configure the devices over an IP based interface and specify which HCC to use, optionally per application or per target UE, e.g., for every target device identified by a unique ID e.g. UE ProSe ID, or for any group of devices identified by a given L2 address, or for any given target IP address, etc. Alternatively, the HCC may be associated with the discovery of a certain ProSe Code or ProSe Service Code that a UE-to-Network relay device may broadcast.

Figure 15:
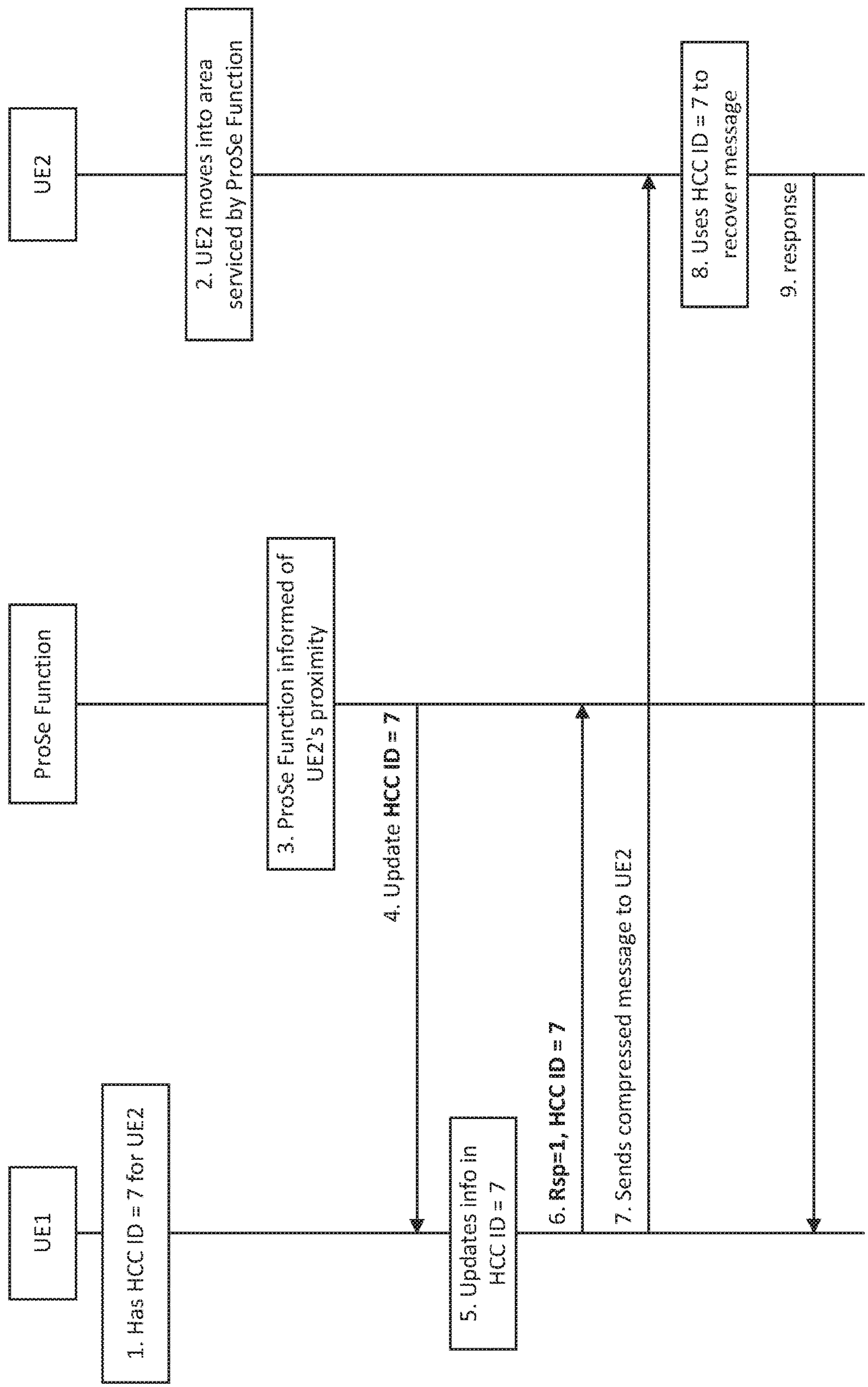
FIG. 15 is a call flow of an example 3GPP D2D communications using dynamic header compression.

FIG. 15 shows a use case in which UE2 moves into the area serviced by the ProSe Function and where UE1 is currently located. Previously, UE1 and UE2 were already communicating directly and HCCs were already created but the UEs were in different networks.

In step 1 of FIG. 15, UE1 and UE2 are already configured to communicate with each other and HCC ID=7 was set up so each can use header compression in their D2D communications. In step 2, UE2 moves into the proximity of UE1 and the ProSe Function. At this point, the ProSe Function may update information in UE2's HCC associated with ID=7. In step 3, the ProSe Function is informed of UE2's proximity. In step 4, the ProSe Function updates UE1 with information in HCC ID=7 about UE2's new IPv6 address.

In step 5, UE1 updates information internally for HCC ID=7. In step 6, UE1 responds to the ProSe Function that update to HCC ID=7 is complete. In step 7, after some time, UE1 sends a data message directly to UE2 using the values in HCC ID=7. In step 8, UE2 receives the message and uses HCC ID=7 to recover the message. In step 9, UE2 sends a response back to UE1.

In 3GPP D2D communications, a device may act as a relay for others that are out of coverage. This relay device is referred to as a UE-to-Network relay, and is herein referred to as a relay. A relay may support both unicast and multicast traffic for devices that are out of coverage, herein referred to as remote devices.

A relay device may configure remote devices, either individually or via unicast communications, or to all the remote devices via broadcast communication or using the discovery channel, with the HCC to use for their communications with each other or with the relay device.

The HCC configuration may be carried in a discovery message that is broadcast by the relay, or may be carried in PC5 signaling message that the relay may send to a remote UE in a unicast manner. The HCC may be associated to a certain application data e.g. it may be associated to data that corresponds to a particular TMGI (Temporary Mobile Group Identity). If associated with a TMGI, the relay UE includes the HCC configuration (or message), and the remote UEs can use the indicated HCC configuration when sending data in the uplink direction that is related to the application that is in turn related to the TMGI. The relay device may also play the role of the ProSe Function as described herein in reference to FIG. 15.

The Header Compression Indicator may be added as another compression scheme for use in 6LoWPAN. Table 5 shows an example of how the HCl can be integrated into the 6LoWPAN encapsulation formats for Dispatch type, Dispatch value, and the type specific header. The Dispatch type is set to "01" to indicate 6LoPWAN encapsulation follows, the Dispatch value (001111) selects HCl as the header compression mechanism, and the HCl headers and Header Data Context fields follow in the type-specific header as shown in Table 6.

TABLE 5

| 0-1 Type | 2-7 Dispatch Selector | 8-31 Type-specific header/Description | |
|---|---|---|---|
| 00 | XXXXXX | NALP | Not a LoWPAN frame |
| 01 | 000000 | ESC | Additional Dispatch byte follows |
| 01 | 000001 | IPv6 | Uncompressed IPv6 addresses |
| 01 | 000010 | LOWPAN_HC1* | LOWPAN_HC1 compressed IPv6* |
| 01 | 000011 | Reserved | Reserved for future use |
| 01 | . . . | Reserved | Reserved for future use |
| 01 | 001111 | HCI | Header Compression Indicator compressed IPv6 |
| 01 | 010000 | LOWPAN_BC0 | LOWPAN_BC0 broadcast |
| 01 | 010001 | Reserved | Reserved for future use |
| 01 | . . . | Reserved | Reserved for future use |
| 01 | 011111 | Reserved | Reserved for future use |
| 01 | 100000 | LOWPAN_IPHC** | LOWPAN_IPHC compressed IPv6** |
| 01 | . . . | LOWPAN_IPHC | LOWPAN_IPHC compressed IPv6** |
| 01 | 111111 | LOWPAN_IPHC | LOWPAN_IPHC compressed IPv6** |
| 10 | XXXXXX | MESH | Mesh Header |
| 11 | 000XXX | FRAG1 | Fragmentation Header (first) |
| 11 | 001000 | Reserved | Reserved for future use |
| 11 | . . . | Reserved | Reserved for future use |
| 11 | 011111 | Reserved | Reserved for future use |
| 11 | 100XXX | FRAGN | Fragmentation Header (subsequent) |
| 11 | 101000 | Reserved | Reserved for future use |
| 11 | . . . | Reserved | Reserved for future use |
| 11 | 111111 | Reserved | Reserved for future use |

*Replaced by LOWPAN_IPHC in RFC6282

**LOWPAN_IPHC occupies the entire 32 Dispatch type field values from 01 100000 to 01 111111

TABLE 6

| 0-1 Type | 2-7 Dispatch Selector | 8-31 Type-specific header | |
|---|---|---|---|
| 01 | 001111 | Header Compression Indicator | Header Context Data |

Figure 16:
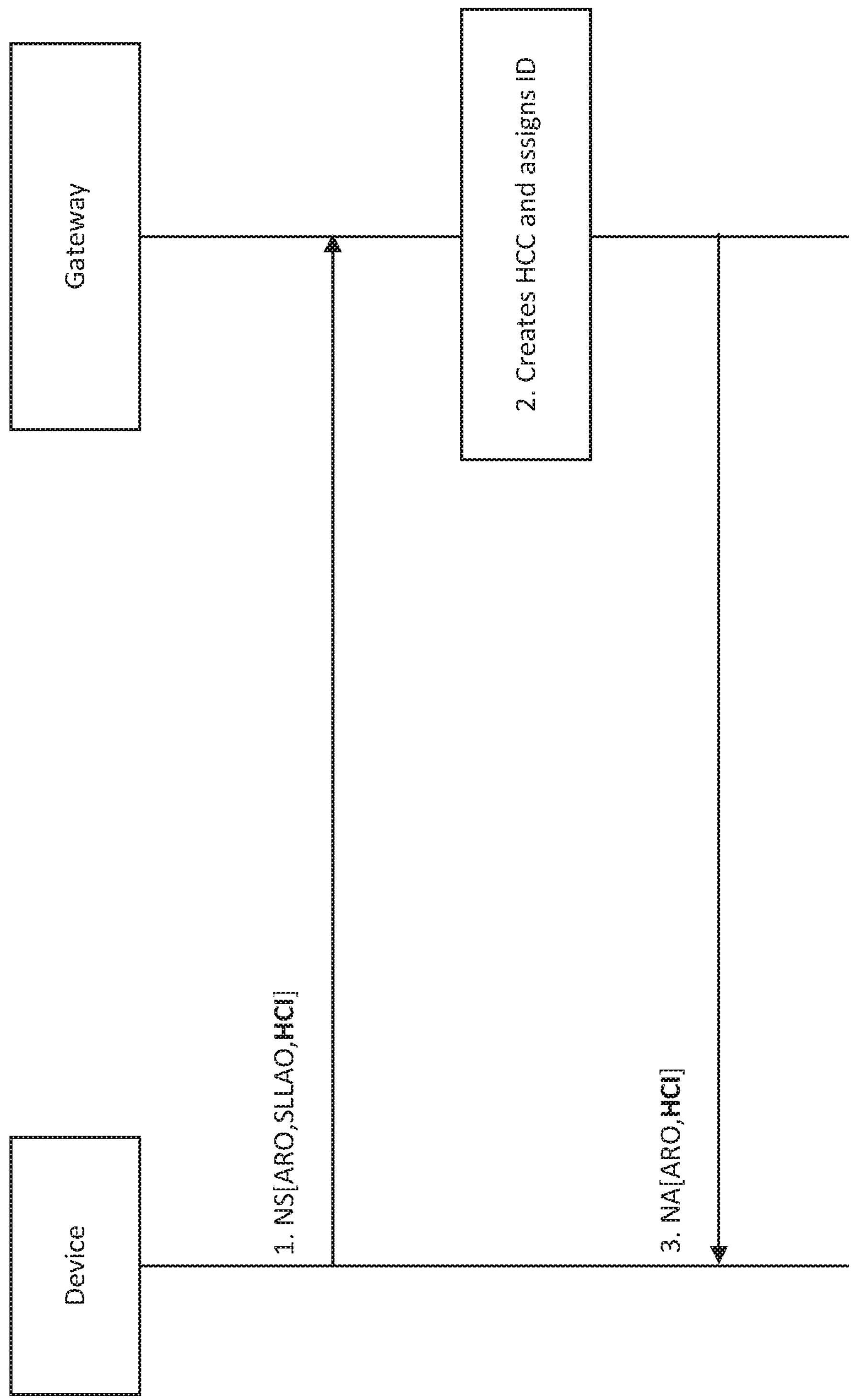
FIG. 16 is a call flow of an example use of header compression context in the Neighbor Discovery protocol.

To create the HCC, a 6LoWPAN device can use the Neighbor Discovery (ND) protocol to request a gateway to create the header compression context as shown in FIG. 16. In step 1 of FIG. 16, the device sends a Neighbor Solicitation (NS) message to register an address with the gateway. The NS message can include the HCl to request the creation of an HCC. In step 2, the gateway processes the NS message appropriately and also creates a HCC as requested by the presence of HCl in step 1. The gateway assigns an ID for the HCC and includes it with other ND parameters in the Neighbor Advertisement (NA) message sent to the device in step 3.

Figure 17:
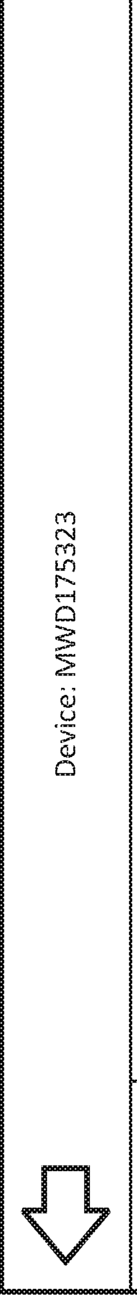
FIG. 17 is an example GUI display showing header compression context details.

A Graphical User Interface (GUI) may be created, at a device such as a gateway, to show the details of a particular context for a certain device. The GUI may show information, such as the information found in FIG. 8, with the corresponding value for each of the headers. FIG. 17 shows such a GUI, which displays the Device ID or Name at the top, the HCC ID and context type on the left hand side, and a table of all headers saved in the context on the right hand side. Selecting any header row allows the user to modify the value for that header. At the top left hand corner is a Back arrow to return to another screen that displays all the devices that communicate with this gateway.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 18:
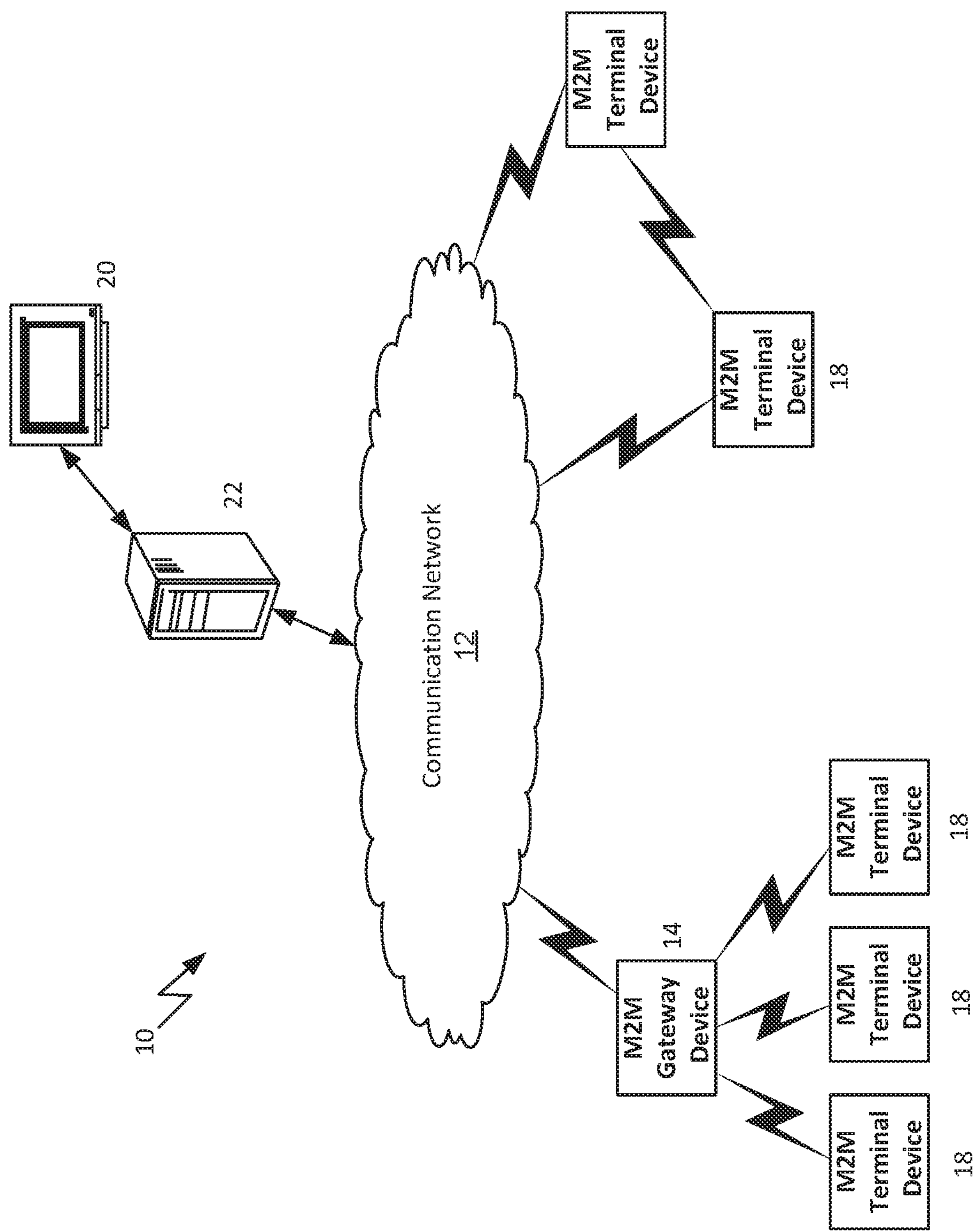
FIG. 18 is a system diagram of an example machine-to-machine (M2M), Internet of Things (IoT), or Web of Things (WoT) communication system in which one or more disclosed embodiments may be implemented.

FIG. 18 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIG. 1-3, 8-10, 15, or 16 may comprise a node of a communication system, such as the ones illustrated in FIG. 1-3, 8-10, 15, or 16.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (e.g., functional interfaces between such functional entities) in order for them to use such capabilities or functionalities.

As shown in FIG. 18, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 18, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 19:
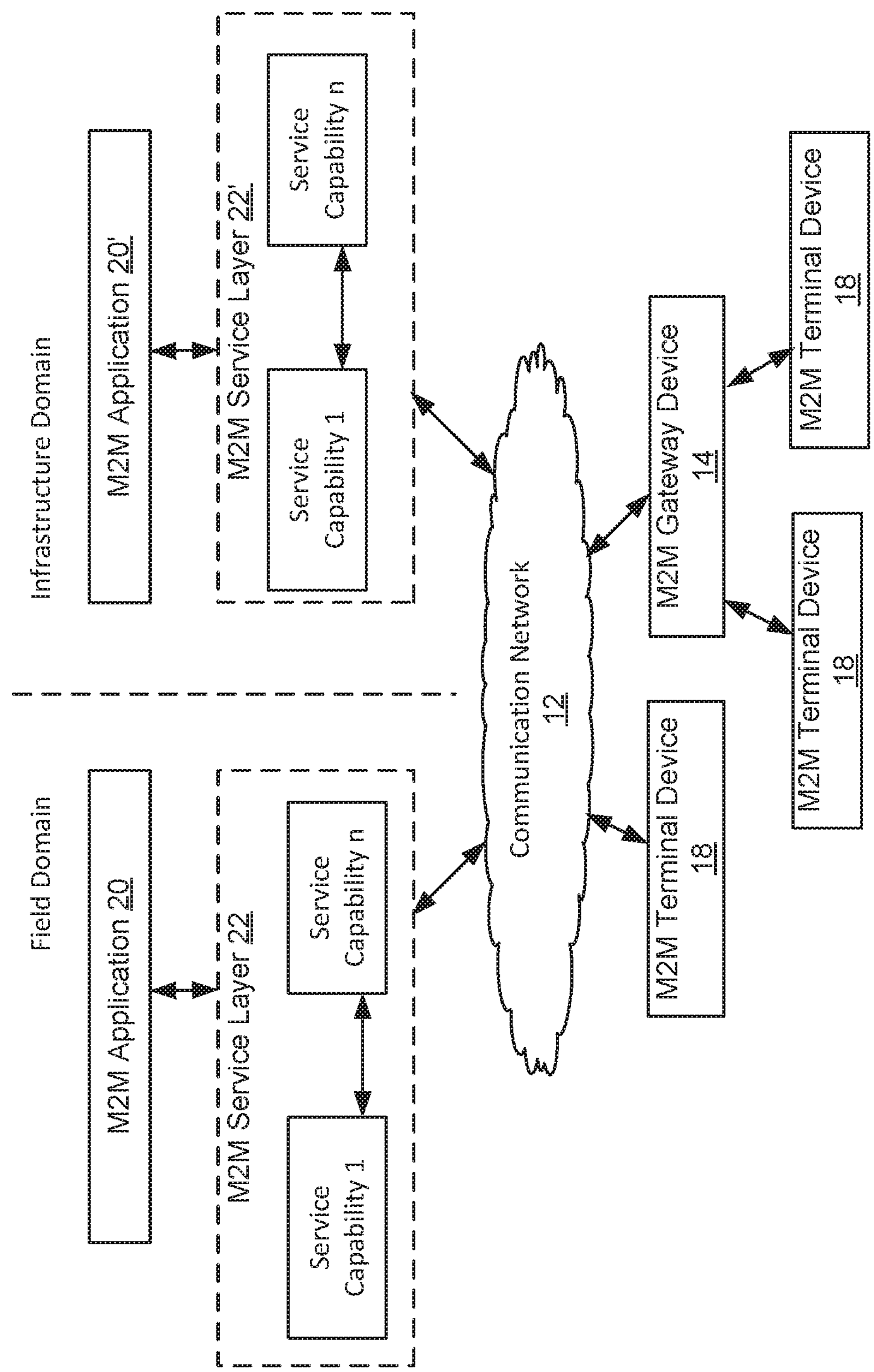
FIG. 19 is a system diagram of an example architecture that may be used within the M2M/IoT/WoT communications system illustrated in FIG. 18.

Referring to FIG. 19, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 19, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 19, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 20 or FIG. 21 described below.

Further, the methods and functionalities described herein may be implemented as part of an M2M network that uses a Service Oriented Architecture (SOA) and/or a Resource-Oriented Architecture (ROA) to access services.

Figure 20:
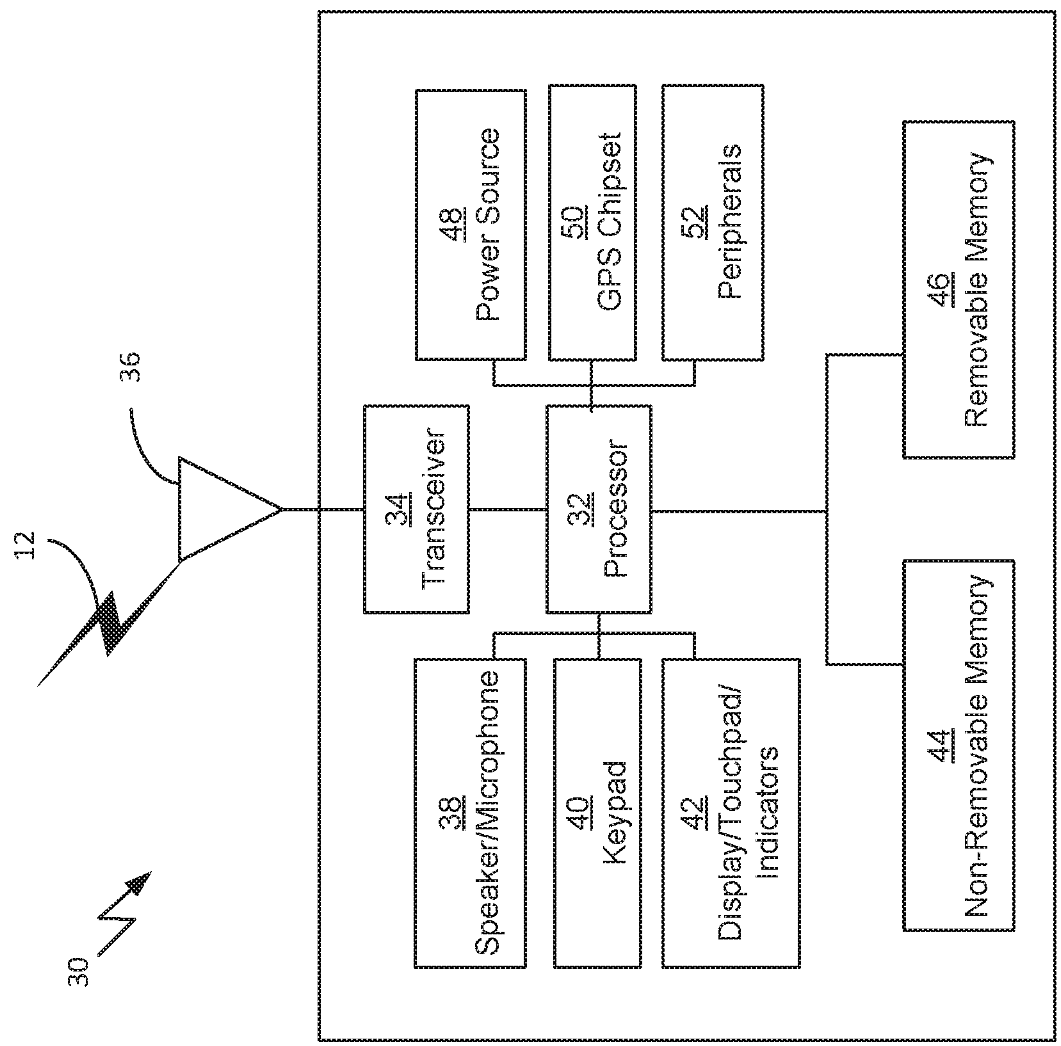
FIG. 20 is a system diagram of an example communication network node, such as an M2M/IoT/WoT device, gateway, or server that may be used within the communications system illustrated in FIGS. 18 and 19.

FIG. 20 is a block diagram of an example hardware/software architecture of a node of a network, such as one of the clients, servers, or proxies illustrated in FIG. 1-3, 8-10, 15, or 16, which may operate as an M2M server, gateway, device, or other node in an M2M network such as that illustrated in FIGS. 1-3, 8-10, 15, 16. As shown in FIG. 20, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements header compression context support, e.g., in relation to the methods described in reference to FIGS. 8-10, 15, 16 or the data structures of FIG. 4-7 or 11-14, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 20, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the header compression context support steps herein, e.g., in relation to FIG. 4-7 or 11-14, or in a claim. While FIG. 20 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 20 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 21:
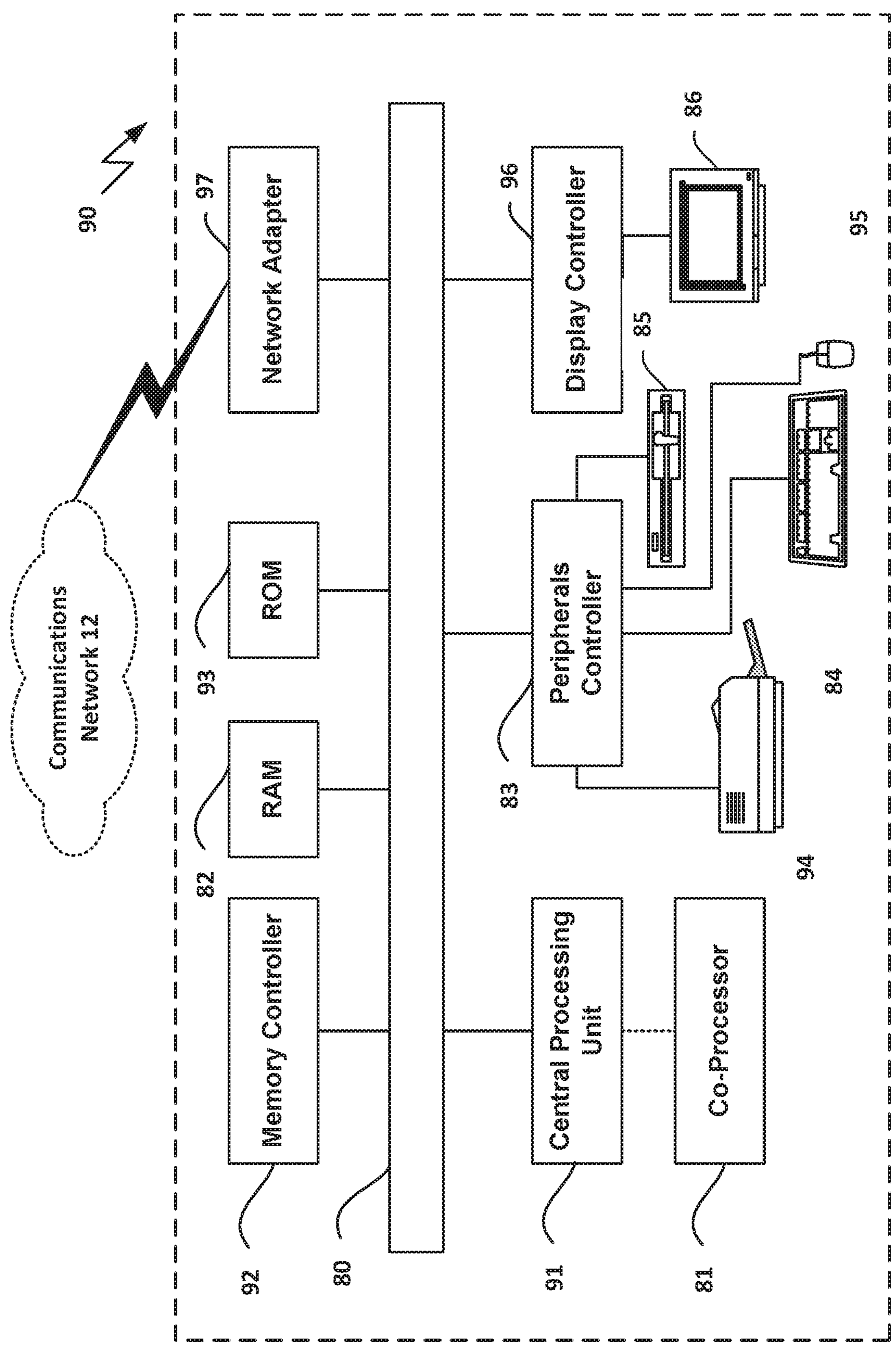
FIG. 21 is a block diagram of an example computing system in which a node of the communication system of FIGS. 18 and 19 may be embodied.

FIG. 21 is a block diagram of an exemplary computing system 90 which may also be used to implement one or more nodes of a network, such as the clients, servers, or proxies illustrated in FIG. 1-3, 8-10, 15, or 16 which may operate as an M2M server, gateway, device, or other node in an M2M network such as that illustrated in FIG. 1-3, 8-10, 15, or 16. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 18-21, to enable the computing system 90 to communicate with other nodes of the network. The communication circuitry, alone or in combination with the CPU 91, may be used to perform the header compression context steps herein, e.g., in relation to FIGS. 6-9, or in a claim.

FIGS. 1-21, the descriptions thereof, and the claims herein illustrate various embodiments of methods and apparatuses for enabling the storage and retrieval of connection context information. In these figures, various steps or operations are shown being performed by one or more clients, servers, and/or proxies. It is understood that the clients, servers, and proxies illustrated in these figures may represent logical entities in a communication network and may be implemented in the form of software (i.e., computer-executable instructions) stored in a memory of, and executing on a processor of, a node of such network, which may comprise one of the general architectures illustrated in FIG. 20 or 21 as described herein. That is, the methods illustrated in FIGS. 8-10, 15, and 16 and the claims may be implemented in the form of software (i.e., computer-executable instructions) stored in a memory of a network node, such as for example the node or computer system illustrated in FIG. 18 or 19, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 20 and 21 respectively) of the node under control of the processor of the node and the computer-executable instructions (e.g., software) that it executes.

The invention claimed is:

1. An apparatus providing a first IoT endpoint, the apparatus comprising a processor, a memory, and communication circuitry, the apparatus being connected to a communications network via the communication circuitry, the apparatus further comprising computer-executable instructions stored in the memory which, when executed by the processor, cause the apparatus to:

send, to a first gateway, a first request, the first request requesting network connectivity parameters, the first request comprising a first header compression indicator and a first set of network parameters, the first header compression indicator requesting that the first gateway create, on the first gateway, a first header compression context; and receive, from the first gateway, a first response comprising an first identifier pertaining to the first header compression context and a first set of requested network connectivity parameters.

2. The apparatus of claim 1, wherein the first request is a network join request.

3. The apparatus of claim 1, wherein the first request is a neighbor discovery request.

4. The apparatus of claim 1, wherein the instructions further cause the apparatus to:

receive, from a second IoT endpoint, a first message comprising a first compressed header and the first identifier; and decompress, based on the first identifier and using the first header compression context, the first compressed header.

5. The apparatus of claim 4, wherein the instructions further cause the apparatus to:

send, to the first gateway, a second request comprising a second header compression indicator header, the second header compression indicator comprising an indication to delete the first header compression context.

6. The apparatus of claim 4, wherein the instructions further cause the apparatus to:

send, to the first gateway, a second request comprising a second header compression indicator header and a second set of communication preferences, the second header compression indicator comprising an indication to update the first header compression context.

7. The apparatus of claim 4, wherein the instructions further cause the apparatus to:

send, via the first gateway, a second message, the second message being addressed to a third IoT endpoint;

receive, from the first gateway, a third message comprising a second identifier pertaining to a second header compression context, the second header compression context pertaining to the third IoT endpoint;

compress, based on the second identifier and using the second header compression context, a header addressing the third apparatus; and send, directly to the third IoT endpoint, a fourth message comprising the compressed header addressing the third apparatus.

8. The apparatus of claim 1, wherein the instructions further cause the apparatus to receive, from the first gateway, an update to the first header compression context.

9. An apparatus providing a first gateway, the apparatus comprising a processor, a memory, and communication circuitry, the apparatus being connected to a communications network via the communication circuitry, the apparatus further comprising computer-executable instructions stored in the memory which, when executed by the processor, cause the apparatus to:

receive, from a first IoT endpoint, a first request, the first request requesting network connectivity parameters and comprising a first header compression indicator and a first set of network parameters;

generate, using the first set of network parameters and a first set of network connectivity parameters, a first header compression context;

assign a first identifier for the first header compression context; and send, to the first IoT endpoint, a first response comprising the first identifier and the first set of network connectivity parameters.

10. The apparatus of claim 9, wherein the first message is a network join request.

11. The apparatus of claim 9, wherein the first message is a neighbor discovery request.

12. The apparatus of claim 9, wherein the instructions further cause the apparatus to:

receive, from the first IoT endpoint, a second request comprising a second header compression indicator header, the second header compression indicator comprising an indication to delete the first header compression context; and delete the first header compression context.

13. The apparatus of claim 9, wherein the instructions further cause the apparatus to:

receive, from the second apparatus, a second request comprising a second header compression indicator header and a second set of communication preferences, the second header compression indicator comprising an indication to update the first header compression context;

generate, using the second set of network parameters, a second header compression context;

assign a second identifier for the second header compression context; and send, to the second apparatus, a second response comprising the second identifier for the second header compression context.

14. An apparatus providing a gateway, the apparatus comprising a processor, a memory, and communication circuitry, the apparatus being connected to a communications network via its communication circuitry, the apparatus further comprising computer-executable instructions stored in the memory which, when executed by the processor, cause the apparatus to:

detect the presence of a first IoT endpoint when the first IoT endpoint comes within range of the network;

identify a second IoT endpoint, the second IoT endpoint being compatible for direct communications with the first IoT endpoint via the network;

determine a first header compression context, the first header compression context being appropriate for communications between the first IoT endpoint and the second IoT endpoint; and send, to the second IoT endpoint, a first message comprising an identifier of the first header compression context and a first set of network parameters.

15. The apparatus of claim 14, wherein the instructions further cause the apparatus to receive, from the first IoT endpoint, a second message comprising the identifier.

16. The apparatus of claim 14, wherein the apparatus provides a 3GPP proximity services function.

* * * * *